US012230209B2

(12) United States Patent
Kim et al.

(10) Patent No.: US 12,230,209 B2
(45) Date of Patent: Feb. 18, 2025

(54) DISPLAY DEVICE

(71) Applicant: LG Display Co., Ltd., Seoul (KR)

(72) Inventors: Ji Ah Kim, Paju-si (KR); Joung Mi Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/533,149

(22) Filed: Dec. 7, 2023

(65) Prior Publication Data

US 2024/0221660 A1 Jul. 4, 2024

(30) Foreign Application Priority Data

Dec. 29, 2022 (KR) ........................ 10-2022-0189377

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0426* (2013.01); *G09G 2310/0291* (2013.01); *G09G 2310/08* (2013.01)

(58) Field of Classification Search
CPC ......... G09G 3/3233; G09G 2300/0426; G09G 3/3266; G09G 2320/0233; G09G 2300/0842; G09G 2300/0819; G09G 2310/08; G09G 2300/0452; G09G 2300/0861; G09G 3/3275; G09G 2310/027; G09G 3/3258; G09G 2320/0626; G09G 2340/0407; G09G 3/3291; G09G 2310/0262; G09G 2310/0286; G09G 2310/0221; G09G 2320/0276; G09G 2330/02; G09G 2300/0408; G09G 2300/0439; H10K 59/65
See application file for complete search history.

(56) References Cited

U.S. PATENT DOCUMENTS 11,532,276 B2 12/2022 Jeong et al.
11,711,953 B2 * 7/2023 Bok ..................... H10K 59/131 257/79
2022/0068211 A1 * 3/2022 Jeong ................... H10K 59/124

FOREIGN PATENT DOCUMENTS

KR 20190036461 A 4/2019
KR 20220027365 A 3/2022

* cited by examiner

*Primary Examiner* — Koosha Sharifi-Tafreshi
(74) *Attorney, Agent, or Firm* — Seed IP Law Group LLP

(57) ABSTRACT

Embodiments disclose a display device including a display panel including a first display region having a plurality of first pixels, and a second display region having a plurality of second pixels and a plurality of light-transmitting regions, a plurality of data lines through which data signals of the plurality of first pixels and the plurality of second pixels are output, a plurality of gate lines through which gate signals of the plurality of first pixels and the plurality of second pixels are output, and a gate driving unit including a plurality of stages configured to output the gate signals to the plurality of gate lines and a dummy stage connected in parallel to at least one of the plurality of stages.

20 Claims, 17 Drawing Sheets

DISPLAY DEVICE

CROSS-REFERENCE TO RELATED APPLICATION

This application claims priority to and the benefit of Korean Patent Application No. 10-2022-0189377, filed on Dec. 29, 2022, the disclosure of which is incorporated herein by reference in its entirety.

BACKGROUND

Technical Field

Embodiments relate to a display device.

Description of Related Art

Electroluminescence display devices may be classified into inorganic light-emitting display devices and organic light-emitting display devices depending on materials of an emission layer. An active-matrix-type organic light-emitting display device includes an organic light-emitting diode (OLED) that emits light by itself and has advantages in terms of a quick response time, high luminous efficiency, high luminance, and a wide viewing angle. The organic light-emitting display device may have an OLED formed in each pixel. The organic light-emitting display device may represent a black grayscale as perfect black as well as having a quick response time, high luminous efficiency, high luminance, and a wide viewing angle, and thus has an excellent contrast ratio and color gamut.

Recently, multimedia functions of a mobile terminal have been improved. For example, a camera is basically built in a mobile terminal and the resolution of the camera is increasing to a level of an existing digital camera. However, a front camera of the mobile terminal limits the design of a screen, thereby making it difficult to design the screen. In order to reduce a space occupied by the camera, a screen design including a notch or a punch hole has been adopted in the mobile terminal, but it is difficult to implement a full-screen display because a screen size is still limited due to the camera.

In order to implement a full-screen display, a method of preparing an imaging region in which low-resolution pixels are disposed in a screen of a display panel, and placing a camera and/or various sensors in the imaging region, has been proposed.

BRIEF SUMMARY

An embodiment is directed to providing a display device in which a resistance deviation of gate lines applied to an imaging region and a display region is improved.

It should be noted that benefits of the present disclosure are not limited to the above-described benefit, and other benefits of the present disclosure will be apparent to those skilled in the art from the following descriptions.

According to an aspect of the present disclosure, there is provided a display device including a display panel including a first display region having a plurality of first pixels, and a second display region having a plurality of second pixels and a plurality of light-transmitting regions, a plurality of data lines through which data signals of the plurality of first pixels and the plurality of second pixels are output, a plurality of gate lines through which gate signals of the plurality of first pixels and the plurality of second pixels are output, and a gate driving unit including a plurality of stages configured to output the gate signals to the plurality of gate lines and a dummy stage connected in parallel to at least one of the plurality of stages.

According to an aspect of the present disclosure, there is provided a display device including a display panel including a first display region having a plurality of first pixels and a second display region having a plurality of second pixels and a plurality of light-transmitting regions, a plurality of data lines through which data signals of the plurality of first pixels and the plurality of second pixels are output, a plurality of gate lines through which gate signals of the plurality of first pixels and the plurality of second pixels are output, and a gate driving unit including a plurality of stages configured to output the gate signals to the plurality of gate lines, and a sub-output buffer connected in parallel to at least one stage of the plurality of stages.

According to an aspect of the present disclosure, there is provided a device including a sensor and a display panel. The display panel includes a first display region and a second display region that has higher transparency than the first display region and overlaps the sensor. The device includes a plurality of data lines that, in operation, output data signals to a first pixel of the first display region and a second pixel of the second display region, a first gate line that extends across the entire display panel and, in operation, outputs a first gate signal to the first pixel, the entire first gate line being outside the second display region, and a second gate line that extends through the second display region and, in operation, outputs a second gate signal to the second pixel and a third pixel that is in the first display region. The device includes a gate driver including a first stage that, in operation, outputs the first gate signal and a second stage that, in operation, outputs the second gate signal, the second stage having lower transistor on-resistance than that of the first stage.

BRIEF DESCRIPTION OF THE SEVERAL VIEWS OF THE DRAWINGS

The above and other benefits, features, and advantages of the present disclosure will become more apparent to those of ordinary skill in the art by describing exemplary embodiments thereof in detail with reference to the accompanying drawings, in which.

DETAILED DESCRIPTION

Figure 1:
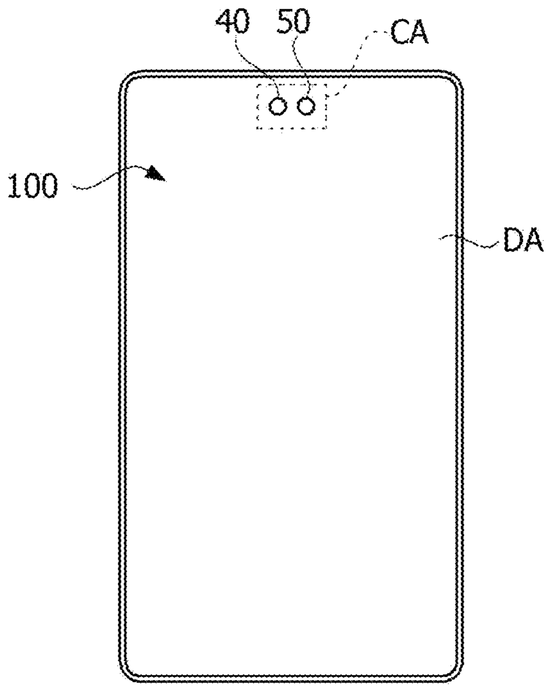
FIG. 1 is a conceptual diagram of a display device according to one embodiment of the present disclosure.

Advantages and features of the present disclosure and implementation methods thereof will be clarified through the following embodiments described with reference to the accompanying drawings. However, the present disclosure is not limited to the embodiments described below and may be implemented with a variety of different forms. The embodiments are merely provided to allow those skilled in the art to completely understand the scope of the present disclosure.

The figures, dimensions, ratios, angles, numbers, and the like disclosed in the drawings for describing the embodiments of the present disclosure are merely illustrative and are not limited to details shown in the present disclosure. Throughout the specification, like reference numerals refer to like elements. Further, in describing the present disclosure, detailed descriptions of well-known technologies will be omitted when it is determined that they may unnecessarily obscure the gist of the present disclosure.

Terms such as "including," "having," and "composed of" used herein are intended to allow other elements to be added unless the terms are used with the term "only." Any references to the singular may include the plural unless expressly stated otherwise.

Components are interpreted as including an ordinary error range even if not expressly stated.

For description of a positional relationship, for example, when the positional relationship between two parts is described as "on," "above," "below," and "next to," or the like, one or more parts may be interposed therebetween unless the term "immediately" or "directly" is used in the expression.

In the description of embodiments, the terms "first," "second," and the like may be used herein to describe various components, the components are not limited by the terms. These terms are used only to distinguish one component from another. Accordingly, a first component described below could be termed a second component without departing from the technical spirit of the present disclosure.

Throughout the specification, like reference numerals refer to like components.

The features of various embodiments may be partially or entirely combined with each other. The embodiments may be interoperated and performed in technically various ways and may be carried out independently of or in association with each other.

Hereinafter, various embodiments of the present disclosure will be described in detail with reference to the accompanying drawings.

Figure 2:
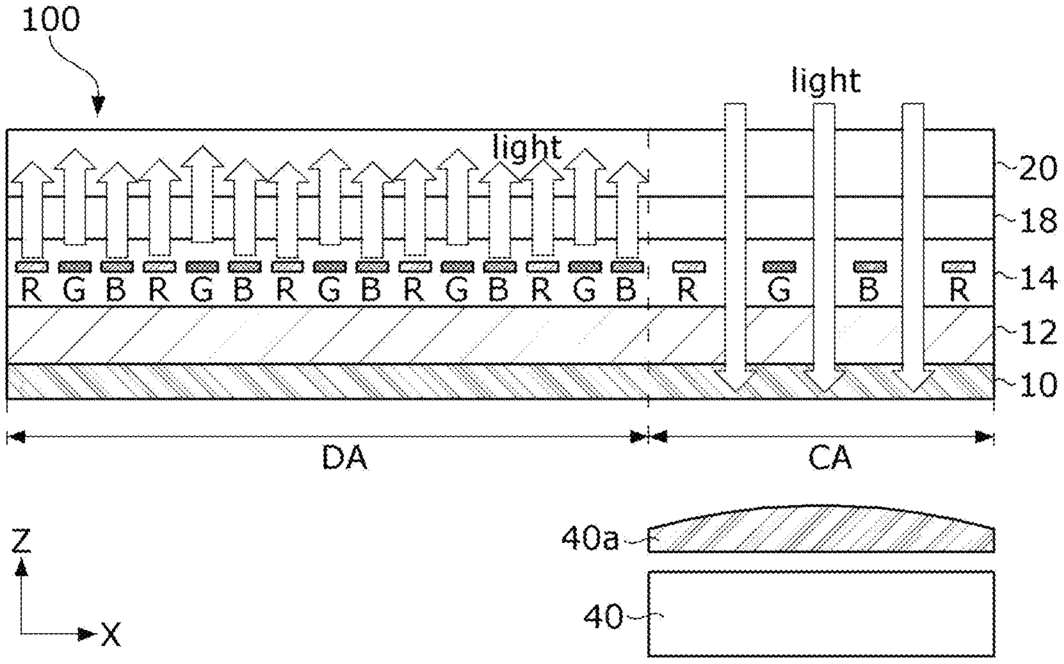
FIG. 2 is a cross-sectional view schematically illustrating a display panel according to one embodiment of the present disclosure.
Figure 3:
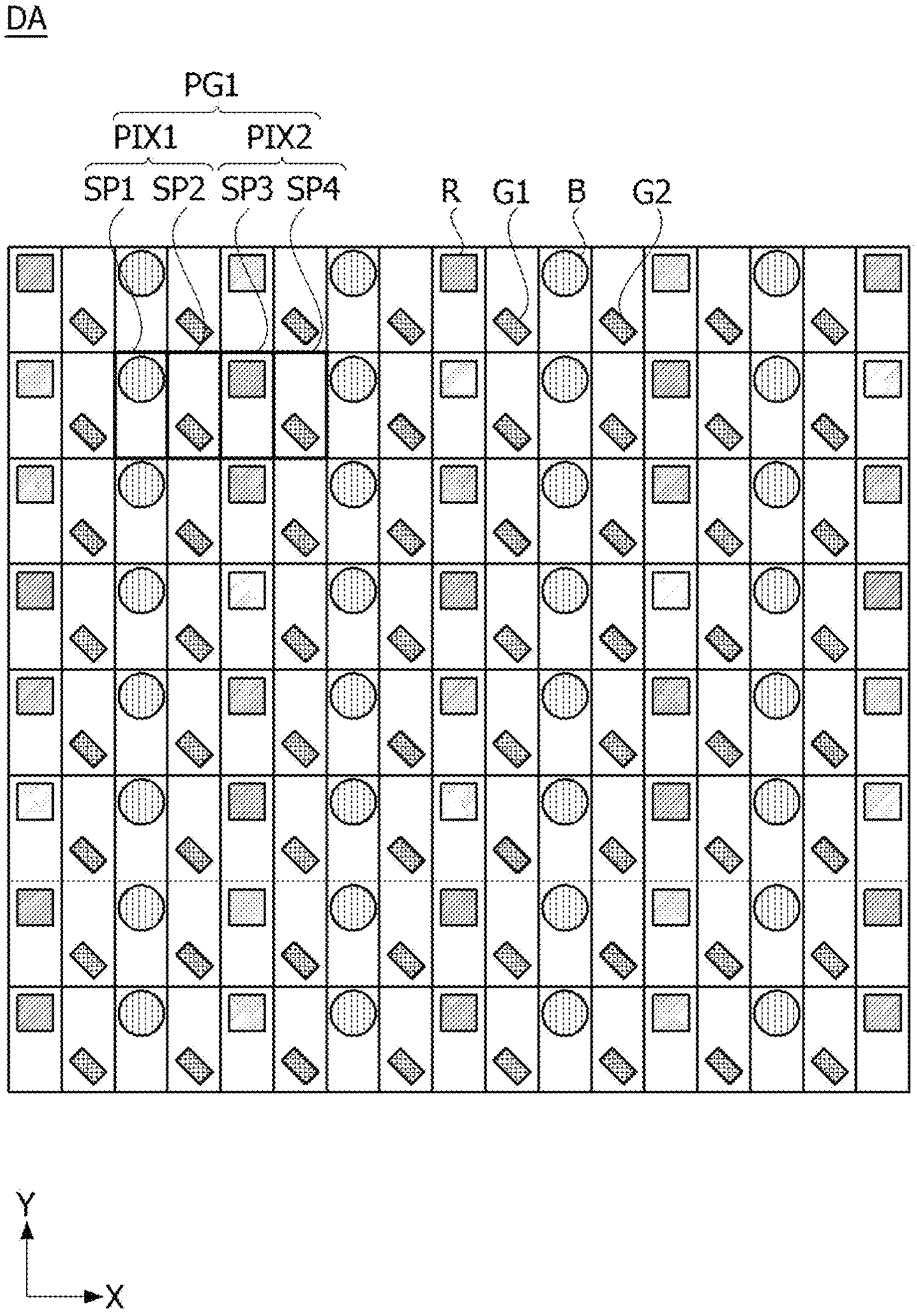
FIG. 3 is a view illustrating a pixel arrangement in a first display region according to one embodiment of the present disclosure.

FIG. 1 is a conceptual diagram of a display device according to one embodiment of the present disclosure. FIG. 2 is a cross-sectional view schematically illustrating a display panel according to the embodiment of the present disclosure. FIG. 3 is a view illustrating a pixel arrangement in a first display region according to one embodiment of the present disclosure.

Referring to FIG. 1, in the display device, an entire surface of a display panel 100 may be configured as a display region. Accordingly, a full-screen display can be enabled.

The display region may include a first display region DA and a second display region CA. The first display region DA and the second display region CA may both output images, but may have different resolutions from each other. As an example, the resolution (or density) of a plurality of second pixels disposed in the second display region CA may be lower than that of a plurality of first pixels disposed in the first display region DA. A relatively large amount of light may be injected into sensors 40 and 50 disposed in the second display region CA by as much as the resolution (or density) lowered in the plurality of second pixels disposed in the second display region CA.

However, the present disclosure is not necessarily limited thereto, and the resolution of the first display region DA and the resolution of the second display region CA may be the same as long as the second display region CA may have sufficient light transmittance or an appropriate compensation algorithm may be implemented.

The second display region CA may be a region in which the sensors 40 and 50 are disposed. The second display region CA is a region that overlaps various sensors and thus may be smaller in area than that of the first display region DA outputting most of the image. The second display region CA may be a sensing region in which various sensors collect information. The second display region CA is illustrated as being disposed at an upper end of the display device, but the present disclosure is not necessarily limited thereto. The position and area of the second display region CA may be variously modified.

The sensors 40 and 50 may include at least one of an image sensor, a proximity sensor, an illumination sensor, a gesture sensor, a motion sensor, a fingerprint recognition sensor, and a biometric sensor. As an example, a first sensor 40 may be an imaging unit or imaging assembly configured to capture an image or a video, and a second sensor 50 may be an illumination sensor or an infrared sensor, but the present disclosure is not necessarily limited thereto.

Referring to FIGS. 2 and 3, the first display region DA and the second display region CA may include a pixel array in which pixels, to which pixel data is written, are disposed. The number of pixels per unit area (hereinafter, referred to as "pixels per inch (PPI)") of the second display region CA may be lower than that of the first display region DA in order to ensure the light transmittance of the second display region CA.

The pixel array of the first display region DA may include a pixel region in which a plurality of pixels having a high PPI are disposed. The pixel array of the second display region CA may include a pixel region in which a plurality of pixels having a relatively low PPI are disposed by being spaced apart from each other by light-transmitting regions. In the second display region CA, external light may pass through the display panel 100 through the light-transmitting regions having high light transmittance and may be received by a sensor placed below the display panel 100.

Since both the first display region DA and the second display region CA include the pixels, an input image may be implemented in the first display region DA and the second display region CA. Accordingly, a full-screen display can be enabled.

Each of the pixels of the first display region DA and the second display region CA may include sub-pixels having different colors to implement a color of an image. The sub-pixels may include red, green, and blue sub-pixels. Although not shown in the drawings, the pixel may further include a white sub-pixel. Each of the sub-pixels may include a pixel circuit part, and red, green, and blue light-emitting elements (organic light-emitting diode: OLED).

The second display region CA may include the pixels, and a lens 40*a* and an imaging unit 40 that are disposed below a screen of the display panel 100. The imaging unit 40 may be a camera including an image sensor. The pixels of the second display region CA may display an input image by writing pixel data of the input image in a display mode.

The imaging unit 40 may capture an external image in an imaging mode and output photo or video image data. The lens 40*a* of the imaging unit 40 may face the second display region CA. External light may be incident on the lens 40*a* of the imaging unit 40 through the second display region CA, and the lens 40*a* may condense light. The imaging unit 40 may be a camera module, but is not necessarily limited thereto, and may be various image acquisition devices capable of acquiring an image.

Due to pixels being removed from the second display region CA in order to ensure light transmittance, an image quality compensation algorithm for compensating luminance and color coordinates of the pixels in the second display region CA may be applied.

The display panel 100 may have a width in an X-axis direction, a length in a Y-axis direction, and a thickness in a Z-axis direction. The display panel 100 may include a circuit layer 12 disposed on a substrate 10, and a light-emitting element layer 14 disposed on the circuit layer 12. A polarizing plate 18 may be disposed on the light-emitting element layer 14, and a cover glass 20 may be disposed on the polarizing plate 18.

The circuit layer 12 may include a pixel circuit connected to lines such as data lines, gate lines, power lines, and the like, a gate driving unit or gate driver connected to the gate lines, and the like.

The circuit layer 12 may include a circuit element such as a transistor implemented as a thin-film transistor (TFT), a capacitor, and the like. The lines and circuit elements of the circuit layer 12 may be implemented with a plurality of insulating layers, two or more metal layers separated from each other with the insulating layers therebetween, and an active layer including a semiconductor material.

The light-emitting element layer 14 may include a light-emitting element driven by the pixel circuit. The light-emitting element may be implemented as an OLED. The OLED may include an organic compound layer formed between an anode and a cathode.

The light-emitting element layer 14 may further include a color filter array disposed on the pixels that selectively transmit light of red, green, and blue wavelengths.

The light-emitting element layer 14 may be covered by a protective film, and the protective film may be covered by an encapsulation layer. The protective film and the encapsulation layer may have a structure in which organic films and inorganic films are alternately stacked. The inorganic films may block the penetration of moisture or oxygen. The organic films may planarize a surface of the inorganic film. When the organic films and the inorganic films are stacked in multiple layers, the penetration of moisture/oxygen affecting the light-emitting element layer 14 may be effectively blocked since a movement path of the moisture or oxygen is increased in length as compared with a single layer.

The polarizing plate 18 may be disposed on the encapsulation layer. The polarizing plate 18 may improve outdoor visibility of the display device. The polarizing plate 18 may reduce the reflection of light from a surface of the display panel 100 and block the light reflected from metal of the circuit layer 12, thereby improving the brightness of the pixels. The polarizing plate 18 may be implemented as a polarizing plate to which a linear polarizing plate and a phase retardation film are bonded, or a circular polarizing plate.

Referring to FIG. 3, the first display region DA may include a plurality of first pixels PG1 arranged in a matrix form. The plurality of first pixels PG1 may include R (e.g., red), G1 (e.g., first green), G2 (e.g., second green), and B (e.g., blue) sub-pixels. For example, a first unit pixel PIX1 may include R and G1 sub-pixels SP1 and SP2, and a second unit pixel PIX2 may include B and G2 sub-pixels SP3 and SP4. However, the present disclosure is not necessarily limited thereto, and the plurality of first pixels PG1 may be real-type pixels including R, G, and B sub-pixels.

Figure 4:
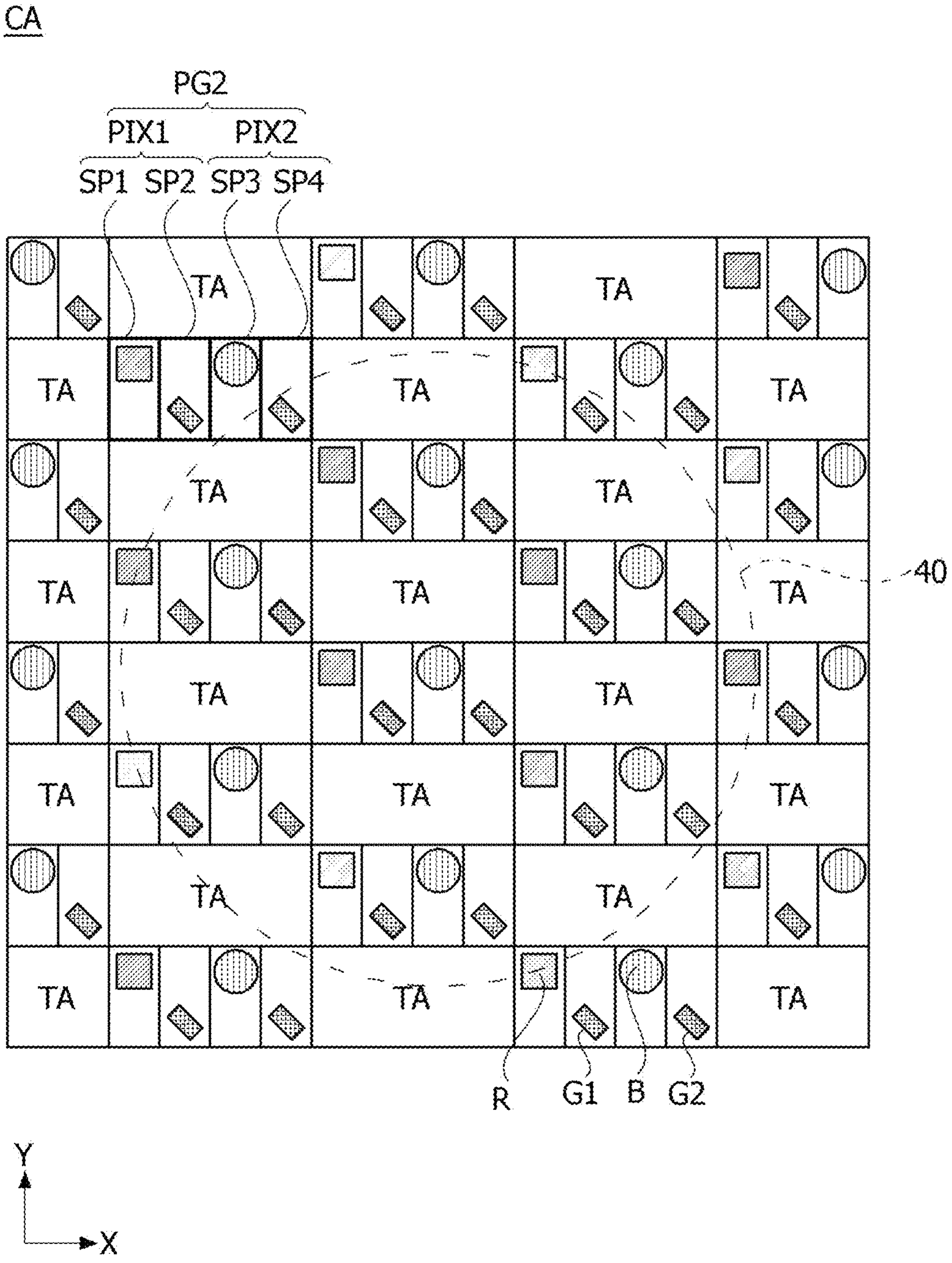
FIG. 4 is a view illustrating pixels and light-transmitting regions of a second display region according to one embodiment of the present disclosure.

FIG. 4 is a view illustrating pixels and light-transmitting regions of the second display region according to one embodiment of the present disclosure.

Referring to FIG. 4, the second display region CA may include a plurality of second pixels PG2 and a plurality of light-transmitting regions TA. The plurality of light-transmitting regions TA may be disposed between the plurality of second pixels PG2. Specifically, each of the light-transmitting regions TA and the second pixels PG2 may be alternately disposed in first and second directions. External light may be received by the imaging unit 40 through the light-transmitting regions TA. A resolution of the second display region CA may decrease relative to a resolution of the first display region DA by the extent to which an area of the light-transmitting region TA increases.

Each of the light-transmitting regions TA may include transparent media having high light transmittance without having metal so that light may be incident with minimum or reduced light loss. The light-transmitting region TA may be made of transparent insulating materials without including metal lines or pixels. As the light-transmitting region TA becomes larger, the light transmittance of the second display region CA may be higher.

Each of the plurality of second pixels PG2 may include one or two pixels. For example, in each of the second pixels PG2, the first unit pixel PIX1 may include the R and G1 sub-pixels SP1 and SP2, and the second unit pixel PIX2 may include the B and G2 sub-pixels SP3 and SP4. The pixel shape and arrangement of the second pixel PG2 may be the same as or different from those of the first pixel PG1.

The shape of the light-transmitting region TA is illustrated as being a quadrangular shape, but the present disclosure is not limited thereto. For example, the light-transmitting region TA may be designed in various shapes such as a circular shape, an elliptical shape, a polygonal shape, or the like.

All metal electrode materials may be removed from the light-transmitting region TA. Accordingly, lines of the pixels may be disposed outside the light-transmitting region TA. Thus, light may be effectively incident through the light-transmitting region. However, the present disclosure is not necessarily limited thereto, and the metal electrode material may be present in a partial region of the light-transmitting region TA.

Figure 5:
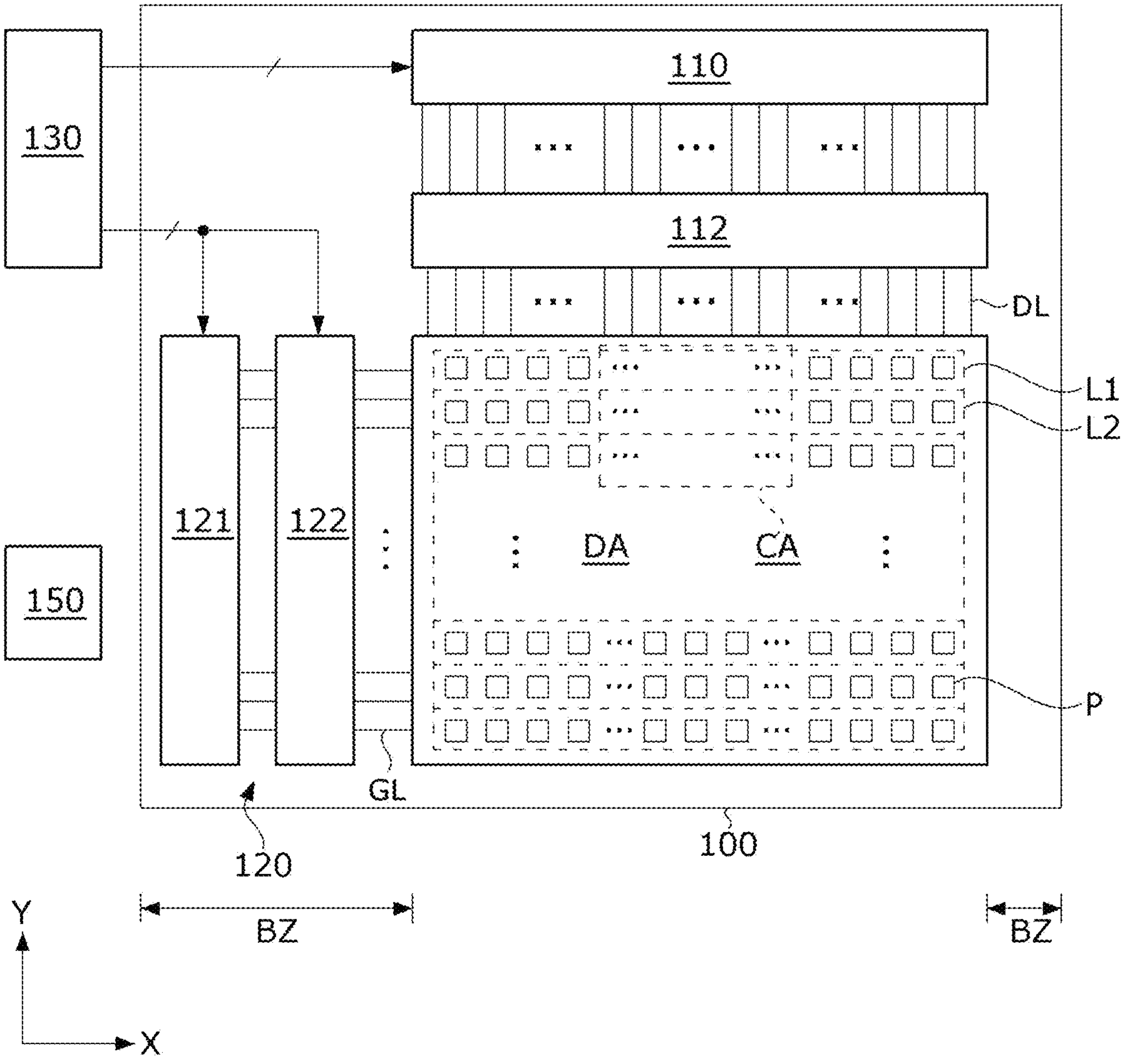
FIG. 5 is a block diagram illustrating the display device according to the embodiment of the present disclosure.
Figure 6:
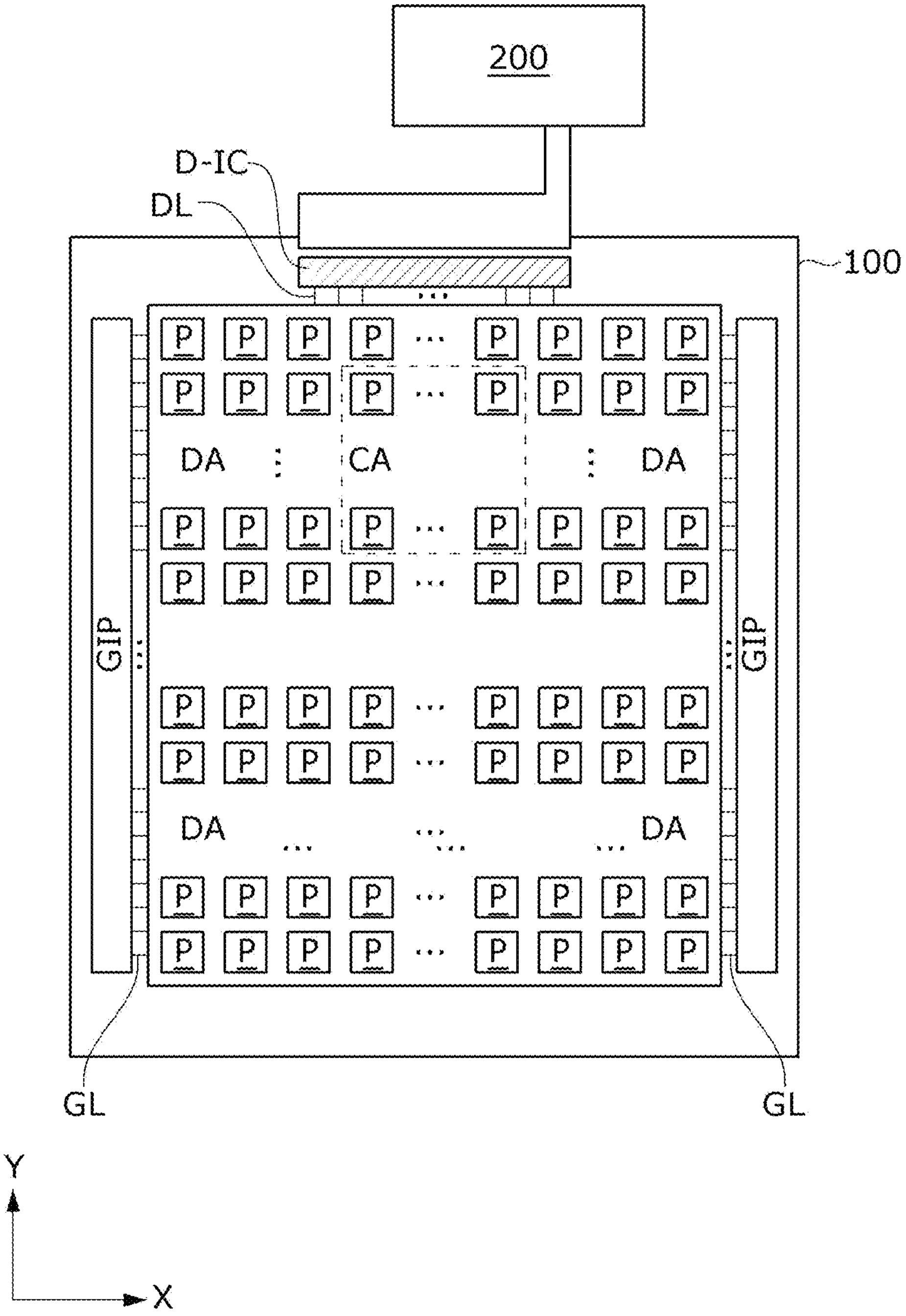
FIG. 6 is a diagram illustrating an example in which the display device according to the embodiment of the present disclosure is applied to an electronic device.

Referring to FIG. 5, the display device according to the embodiment of the present disclosure includes the display panel 100, display panel driving units or display panel drivers 110 and 120 for writing pixel data of an input image to pixels P of the display panel 100, a timing controller 130 for controlling the display panel driving units, and a power supply unit or power supply 150 configured to generate power beneficial for driving the display panel 100. The term unit as used in the throughout the specification includes within its meaning an circuit and a physical assembly. For example, the display panel driving units 110, 120 include circuits.

The display panel 100 includes a pixel array configured to display an input image on a screen. As described above, the pixel array may be divided into the first display region DA and the second display region CA having a lower resolution or PPI as compared with the first display region DA. Since the first display region DA includes the high-PPI pixels P and thus has a larger size as compared with the second display region CA, most image information is displayed in the first display region DA. A sensor module overlapping the second display region CA may be disposed below the display panel 100.

Touch sensors may be disposed on the screen of the display panel 100. The touch sensors may be implemented as on-cell type or add-on type touch sensors, which are arranged on the screen of the display panel, or may be implemented as in-cell type touch sensors, which are embedded in the pixel array.

The display panel 100 may be implemented as a flexible display panel in which the pixels P are disposed on a flexible substrate such as a plastic substrate and a metal substrate. In a flexible display, the size and shape of the screen may be varied by a method of rolling, folding, and bending the flexible display panel. The flexible display may include a slidable display, a rollable display, a bendable display, a foldable display, and the like.

The display panel driving unit may drive the pixels P by applying an internal compensation technique.

The display panel driving unit reproduces an input image on the screen of the display panel 100 by writing pixel data of the input image to the sub-pixels. The display panel driving unit includes a data driving unit or data driver 110 and a gate driving unit or gate driver 120. The display panel driving unit may further include a demultiplexer 112 disposed between the data driving unit 110 and data lines DL.

The display panel driving unit may operate in a low-speed driving mode under the control of the timing controller 130. In the low-speed driving mode, when the input image is analyzed and does not change for a predetermined or selected time, power consumption of the display device may be reduced. In the low-speed driving mode, when a still image is input for a predetermined or selected time or more, power consumption may be reduced by controlling a data write period of the pixels P to be longer by reducing a refresh rate of the pixels P. The low-speed driving mode is not limited to a case when a still image is input. For example, when the display device operates in a standby mode or when a user command or an input image is not input to a display panel driving circuit for a predetermined or selected time or more, the display panel driving circuit may operate in the low-speed driving mode.

The data driving unit 110 samples pixel data to be written to the pixels of the first display region DA from pixel data received from the timing controller 130. The data driving unit 110 converts the pixel data to be written to the pixels of the first display region DA into a gamma compensation voltage using a digital-to-analog converter (hereinafter referred to as "DAC") and outputs a data voltage Vdata. The data voltage Vdata output from channels of the data driving unit 110 may be applied to the data lines DL connected to the pixels of the first display region DA through the demultiplexer 112 or may be applied directly to the data lines DL.

The demultiplexer 112 time-divides and distributes the data voltage Vdata output through the channels of the data driving unit 110 to a plurality of data lines DL. Due to the demultiplexer 112, the number of channels of the data driving unit 110 may be reduced. The demultiplexer 112 may be omitted.

The gate driving unit 120 may be implemented as a gate in panel (GIP) circuit that is directly formed on a bezel region BZ of the display panel 100 together with a TFT array of the pixel array. The gate driving unit 120 outputs gate signals to gate lines GL connected to the pixels of the first display region DA under the control of the timing controller 130. The gate driving unit 120 may sequentially supply the signals to the gate lines GL connected to the pixels of the first display region DA by shifting the gate signals using a shift register. A voltage of the gate signal swings between a gate-off voltage VGH and a gate-on voltage VGL.

The gate signal applied to the pixels of the first display region DA may include a pulse of a scan signal (hereinafter referred to as "scan pulse"), a pulse of an emission control signal (hereinafter referred to as "EM pulse"), and the like. The gate lines GL connected to the pixels of the first display region DA may include scan lines to which the scan pulse is applied and EM lines to which the EM pulse is applied.

The gate driving unit 120 may be disposed on each of left and right bezels BZ of the display panel 100 to supply the gate signal to the gate lines GL using a double feeding method. In the double feeding method, the gate driving units 120 divided and disposed on both bezel of the display panel 100 are synchronized by the timing controller 130 so that the gate signals may be simultaneously applied at both ends of one gate line. In another embodiment, the gate driving unit 120 may be disposed on one side of the left and right bezels of the display panel 100 to supply the gate signals to the gate lines GL using a single feeding method.

The gate driving unit 120 may include a 1-1 gate driving unit 121 and a 1-2 gate driving unit 122. The 1-1 gate driving unit 121 outputs the scan pulse, and shifts the scan pulse according to a shift clock to sequentially supply the scan pulse to the scan lines connected to the pixels of the first display region DA and the second display region CA. The 1-2 gate driving unit 122 outputs the EM pulse, and shifts the EM pulse according to the shift clock to sequentially supply the EM pulse to the EM lines connected to the pixels of the first display region DA.

The timing controller 130 receives pixel data of an input image and a timing signal synchronized with the pixel data from a host system. The timing signal includes a vertical synchronization signal Vsync, a horizontal synchronization signal Hsync, a clock CLK, a data enable signal DE, and the like. One period of the vertical synchronization signal Vsync is one frame period. One period of each of the horizontal synchronization signal Hsync and the data enable signal DE is one horizontal period 1H. A pulse of the data enable signal DE is synchronized with one piece of line data to be written to the pixels P of one pixel line. Since a frame period and a horizontal period may be obtained through a method of counting the data enable signal DE, the vertical synchronization signal Vsync and the horizontal synchronization signal Hsync may be omitted.

The timing controller 130 transmits the pixel data of the input image to the data driving units 110 and controls an operation timing of the display panel driving unit to synchronize the data driving unit 110, the demultiplexer 112, and the gate driving unit 120.

The timing controller 130 may multiply an input frame frequency by i (i is a natural number) and control the operation timing of each of the display panel driving units 110 and 120 at a frame frequency of the input frame frequency×i Hz. The input frame frequency is 60 Hz in the National Television Standards Committee (NTSC) scheme and 50 Hz in the Phase-Alternating Line (PAL) scheme. The timing controller 130 may lower the frame frequency to a frequency between 1 Hz to 30 Hz in order to lower the refresh rate of the pixels P in the low-speed driving mode.

The timing controller 130 may generate a data timing control signal for controlling an operation timing of the data driving unit 110, a switch control signal for controlling an operation timing of the demultiplexer 112, and a gate timing control signal for controlling an operation timing of the gate driving unit 120 based on the timing signals Vsync, Hsync, and DE received from the host system.

The gate timing control signal may include a start pulse, a shift clock, a reset signal, an initialization signal, and the like. A voltage level of the gate timing control signal output from the timing controller 130 may be converted into a gate-off voltage VGH/VEH and a gate-on voltage VGL/VEL through a level shifter that is omitted from the drawing, and may be supplied to the gate driving unit 120. The level shifter may convert a low-level voltage of the gate timing control signal into the gate-on voltage VGL, and convert a high-level voltage of the gate timing control signal into the gate-off voltage VGH.

The power supply unit 150 may include a charge pump, a regulator, a buck converter, a boost converter, a programmable gamma integrated circuit (P-GMA IC), and the like. The power supply unit 150 generates power beneficial for driving the display panel driving unit and the display panel 100 by adjusting a direct current (DC) input voltage from the host system. The power supply unit 150 may output DC voltages such as a gamma reference voltage, the gate-off voltage VGH/VEH, the gate-on voltage VGL/VEL, a pixel driving voltage ELVDD, a low-potential power supply voltage ELVSS, an initialization voltage Vini, a reference voltage Vref, and the like. The programmable gamma IC may change the gamma reference voltage according to a register setting value. The gamma reference voltage is supplied to the data driving unit 110. The gate-off voltage VGH/VEH and the gate-on voltage VGL/VEL are supplied to the level shifter and the gate driving unit 120. The pixel driving voltage ELVDD, the low-potential power supply voltage ELVSS, the initialization voltage Vini, and the reference voltage Vref are commonly supplied to pixel circuits through the power lines. The pixel driving voltage ELVDD is set to a voltage higher than the low-potential power supply voltage ELVSS, the initialization voltage Vini, and the reference voltage Vref.

The host system may be a main circuit board of a television (TV) system, a set-top box, a navigation system, a personal computer (PC), a vehicle system, a home theater system, a mobile device, or a wearable device.

Figure 7:
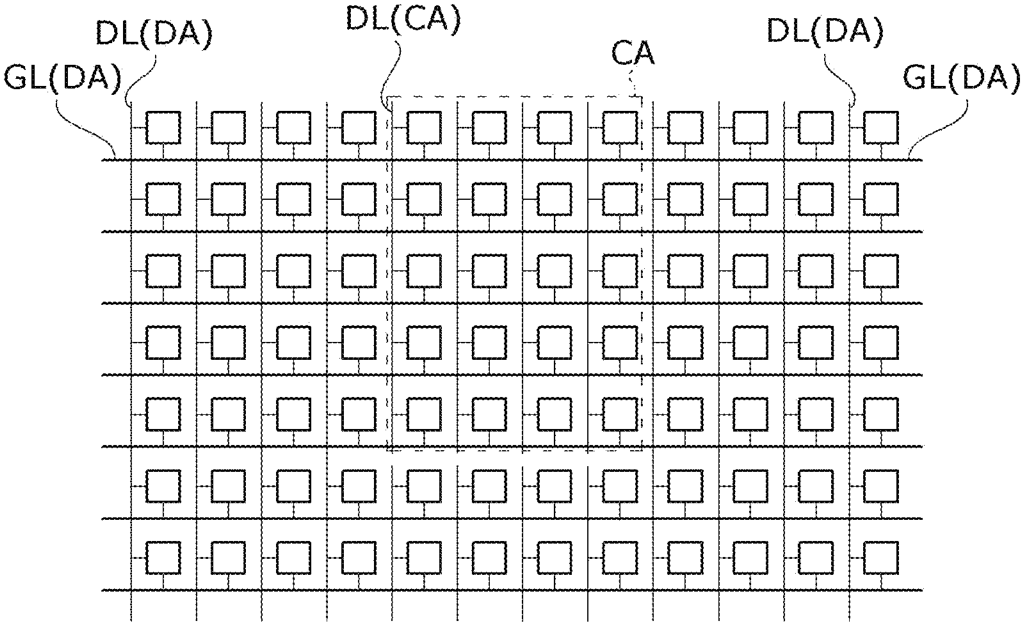
FIG. 7 is a view illustrating data lines and gate lines of the first display region and the second display region.

Referring to FIG. 7, the gate lines GL may be commonly connected to the first display region DA and the second display region CA. Accordingly, the pixel circuit disposed in the first display region DA and the pixel circuit disposed in the second display region CA may operate according to the same scan signal and the EM signal. According to this configuration, the first display region DA and the second display region CA are not separately driven, and thus, the scan lines and the EM lines may be simplified.

The data lines DL may be divided into the data lines disposed in the first display region DA and the data lines disposed in the second display region CA. Thus, in order to compensate for a luminance difference between the first and second display regions DA and CA, a voltage range applied to the data lines DL of the second display region CA may be greater than a voltage range applied to the data lines DL of the first display region DA. However, the present disclosure is not necessarily limited thereto, and the data lines of the first and second display regions DA and CA may be connected to each other to have the same voltage range.

Figure 8:
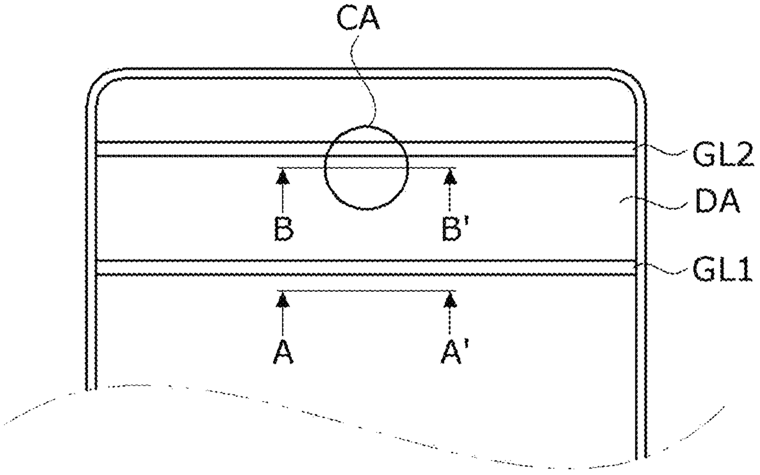
FIG. 8 is a view illustrating an electronic device in which the display device of the present disclosure is implemented.
Figure 9:
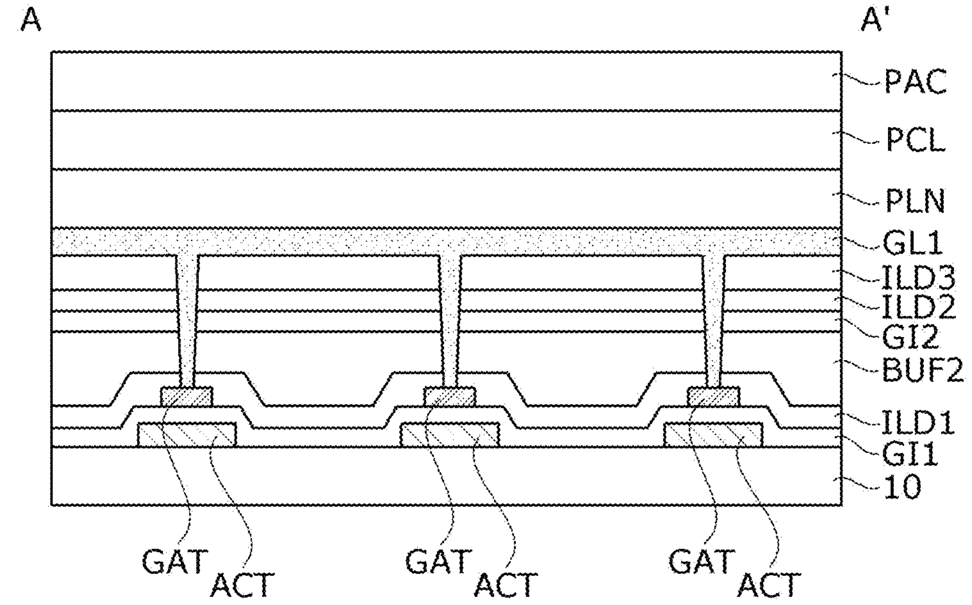
FIG. 9 is a view illustrating a cross section taken along line A-A' of FIG. 8.

Referring to FIGS. 8 and 9, in the first display region DA, a first gate line GL1 may be formed using source/drain (SD) wiring. Since the first display region DA does not need to have a high transmittance, the SD wiring with relatively low resistance may be used to connect gate electrodes GAT of each driving element at a beneficial position.

Figure 10:
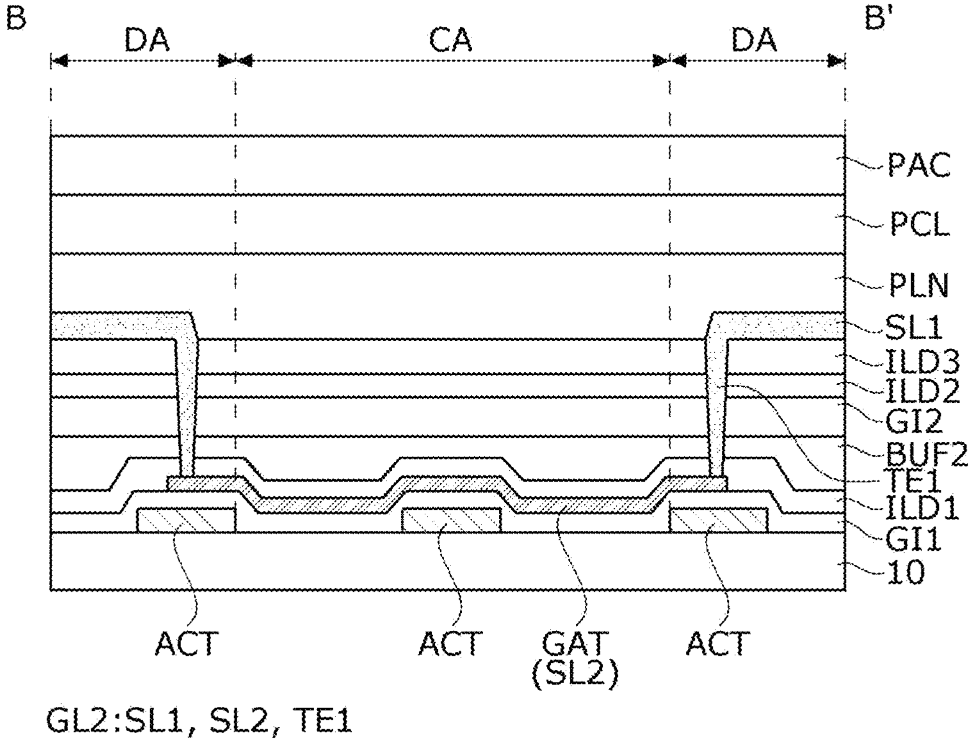
FIG. 10 is a view illustrating a cross section taken along line B-B' of FIG. 8.

However, as shown in FIG. 10, in order to increase a transmittance, a second gate line GL2 may be formed in the second display region CA by using the gate electrode GAT. Since the second signal line SL2 disposed in the second display region CA is disposed so as not to overlap the light transmitting area TA, the transmittance of the second display area CA is improved.

The second gate line GL2 may include a first signal line SL1 disposed in the first display region DA, a second signal line SL2 disposed inside the second display region CA, and a through electrode TE1 that connects the first signal line SL1 and the second signal line SL2. The second signal line SL2 can be formed using the gate electrode. Accordingly, the second signal line SL2 is disposed at a layer lower than the first signal line SL1 and has a relatively higher resistance.

As a result, there is a problem of a resistance deviation in which the resistance of the second gate line GL2 is higher than the resistance of the first gate line GL1.

Figure 11:
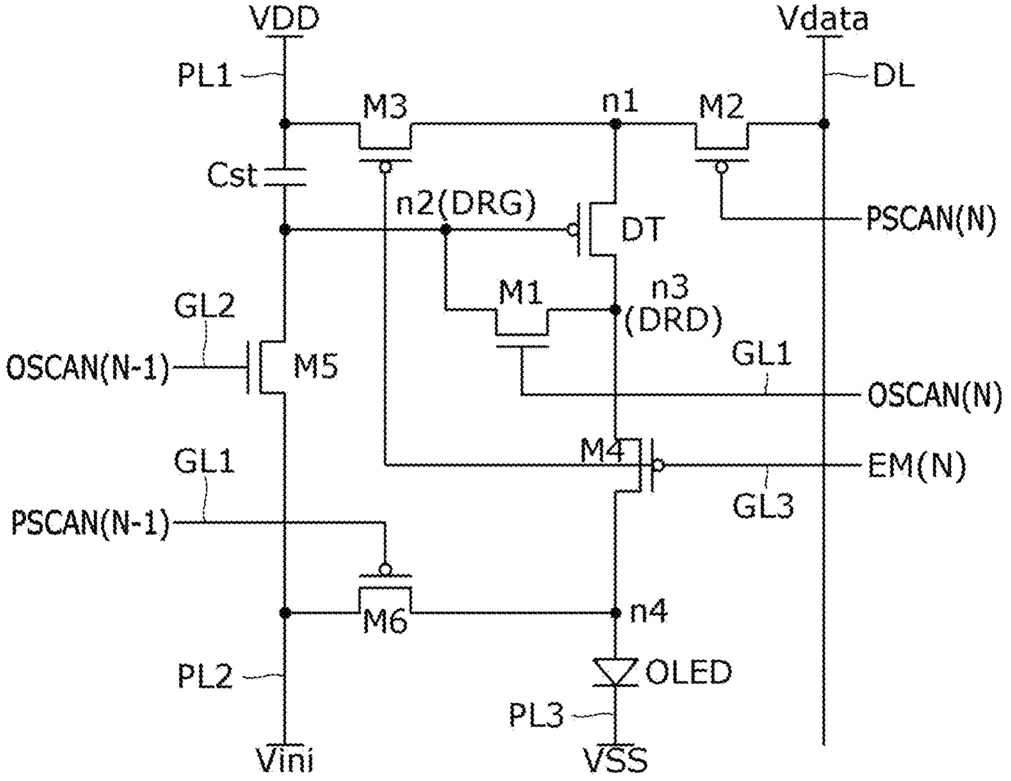
FIG. 11 is a circuit diagram illustrating an example of a pixel circuit to which an internal compensation circuit is applied.
Figure 12:
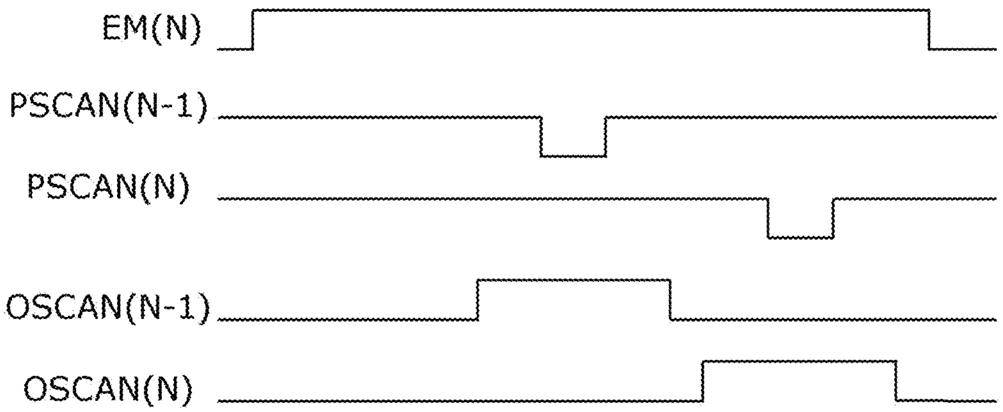
FIG. 12 is a diagram illustrating driving timings of the pixel circuit shown in FIG. 11.

Referring to FIGS. 11 and 12, the pixel circuit according to one embodiment of the present disclosure includes a light-emitting element OLED, a driving element DT configured to supply a current to the light-emitting element OLED, and an internal compensation circuit configured to sample a threshold voltage Vth of the driving element DT using a plurality of switch elements M1, M2, M3, M4, M5, M6 and to compensate for a gate voltage of the driving element DT by as much as the threshold voltage Vth of the driving element DT. Each of the switch elements M1 and M5 may be implemented as an n-channel TFT, and each of the driving element DT and the remaining switch elements M2, M3, M4 and M6 may be implemented as a p-channel TFT.

The light-emitting element OLED may be implemented as an organic light-emitting diode or an inorganic light-emitting diode. Hereinafter, an example in which the light-emitting element OLED is implemented as an organic light-emitting diode will be described.

The light-emitting element OLED may include an organic compound layer formed between an anode and a cathode. The organic compound layer may include a hole injection layer HIL, a hole transport layer HTL, an emission layer EML, an electron transport layer ETL, and an electron injection layer EIL, but the present disclosure is not limited thereto. When a voltage is applied to the anode and the cathode of the OLED, holes passing through the hole transport layer HTL and electrons passing through the electron transport layer ETL move to the emission layer EML to create excitons, and thus visible light may be emitted from the emission layer EML.

The anode of the light-emitting element OLED is connected to a fourth node n4 between fourth and sixth switch elements M4 and M6. The fourth node n4 is connected to the anode of the light-emitting element OLED, a second electrode of the fourth switch element M4, and a second electrode of the sixth switch element M6. The cathode of the light-emitting element OLED is connected to a VSS line PL3 through which a low-potential power supply voltage VSS is applied. The light-emitting element OLED emits light with a current Ids that flows according to a gate-source voltage Vgs of the driving element DT. A third switch element M3 and the fourth switch element M4 switch current paths of the light-emitting element OLED.

The driving element DT adjusts the current Ids, which flows in the light-emitting element OLED according to the gate-source voltage Vgs, to drive the light-emitting element OLED. The driving element DT includes a gate electrode connected to a second node n2, a first electrode connected to a first node n1, and a second electrode connected to a third node n3.

A storage capacitor Cst is connected between a VDD line PL1 and the second node N2. A data voltage Vdata, which is compensated for by as much as the threshold voltage Vth of the driving element DT, is charged to the storage capacitor Cst. Since the data voltage Vdata in each sub-pixel is compensated for by as much as the threshold voltage Vth of the driving element DT, a characteristic deviation of the driving element DT in each sub-pixel is compensated for.

A first switch element M1 is turned on in response to a gate-on voltage VGH of an Nth scan pulse OSCAN(N) to connect the second node n2 to the third node n3. The second node n2 is connected to the gate electrode of the driving element DT, a first electrode of the storage capacitor Cst, and a first electrode of the first switch element M1. The third node n3 is connected to the second electrode of the driving element DT, a second electrode of the first switch element M1, and a first electrode of the fourth switch element M4. A gate electrode of the first switch element M1 is connected to the first gate line GL1 to receive the Nth scan pulse OSCAN(N). The first electrode of the first switch element M1 is connected to the second node n2, and the second electrode thereof is connected to the third node n3.

A second switch element M2 is turned on in response to a gate-on voltage VGL of an Nth scan pulse PSCAN(N) to supply the data voltage Vdata to the first node n1. A gate electrode of the second switch element M2 may be connected to the first gate line GL1 to receive the Nth scan pulse PSCAN(N). A first electrode of the second switch element M2 is connected to the first node n1. A second electrode of the second switch element M2 is connected to a data line DL through which the data voltage Vdata is applied. The first node n1 is connected to the first electrode of the second switch element M2, a second electrode of the third switch element M3, and the first electrode of the driving element DT.

The third switch element M3 is turned on in response to a gate-on voltage VGL of an emission signal EM(N) to connect the VDD line PL1 to the first node n1. A gate electrode of the third switch element M3 is connected to a third gate line GL3 to receive the emission signal EM(N). A first electrode of the third switch element M3 is connected to the VDD line PL1. A second electrode of the third switch element M3 is connected to the first node n1.

The fourth switch element M4 is turned on in response to the gate-on voltage VGL of the emission signal EM(N) to connect the third node n3 to the anode of the light-emitting element OLED. A gate electrode of the fourth switch element M4 is connected to the third gate line GL3 to receive the emission signal EM(N). The first electrode of the fourth switch element M4 is connected to the third node n3, and the second electrode thereof is connected to the fourth node n4.

A fifth switch element M5 is turned on in response to a gate-on voltage VGH of an (N−1)th scan pulse OSCAN(N−1) to connect the second node n2 to a Vini line PL2. A gate electrode of the fifth switch element M5 is connected to a gate line GL2 to receive the (N−1) scan pulse OSCAN(N−1). A first electrode of the fifth switch element M5 is connected to the second node n2, and a second electrode thereof is connected to the Vini line PL2.

The sixth switch element M6 is turned on in response to a gate-on voltage VGL of an (N−1) scan pulse PSCAN(N−1) to connect the Vini line PL2 to the fourth node n4. A gate electrode of the sixth switch element M6 is connected to the first gate line GL1 to receive the (N−1) scan pulse PSCAN (N−1). A first electrode of the sixth switch element M6 is connected to the Vini line PL2, and a second electrode thereof is connected to the fourth node n4.

Figure 13:
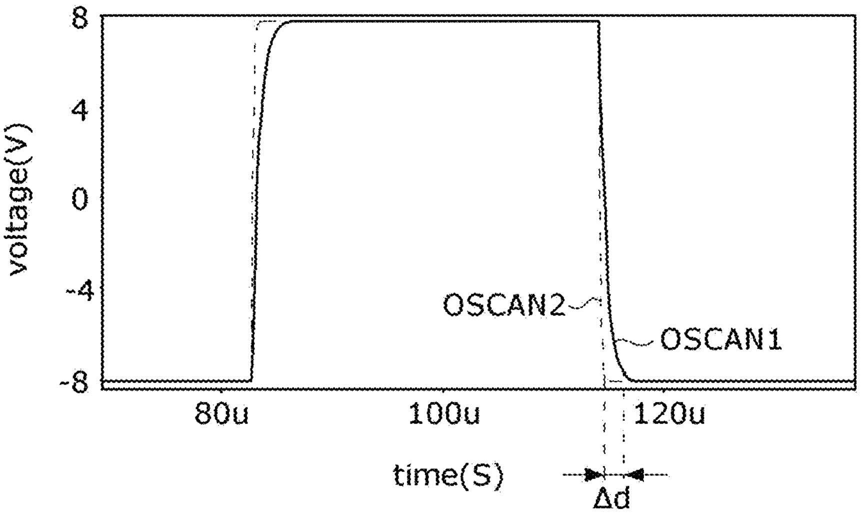
FIGS. 13 to 15 are diagrams illustrating a result of simulating a charging speed of the pixel circuit according to one embodiment.

Referring to FIG. 8, the second gate line GL2 has a relatively high resistance as compared to the first gate line GL1. Referring to FIG. 13, when OSCAN1 which is the pulse which is output from the second gate line GL2 is dropped from high to low, a delay (Δd) occurs compared to OSCAN2 which is the pulse which is output from the first gate line GL1.

Figure 14:
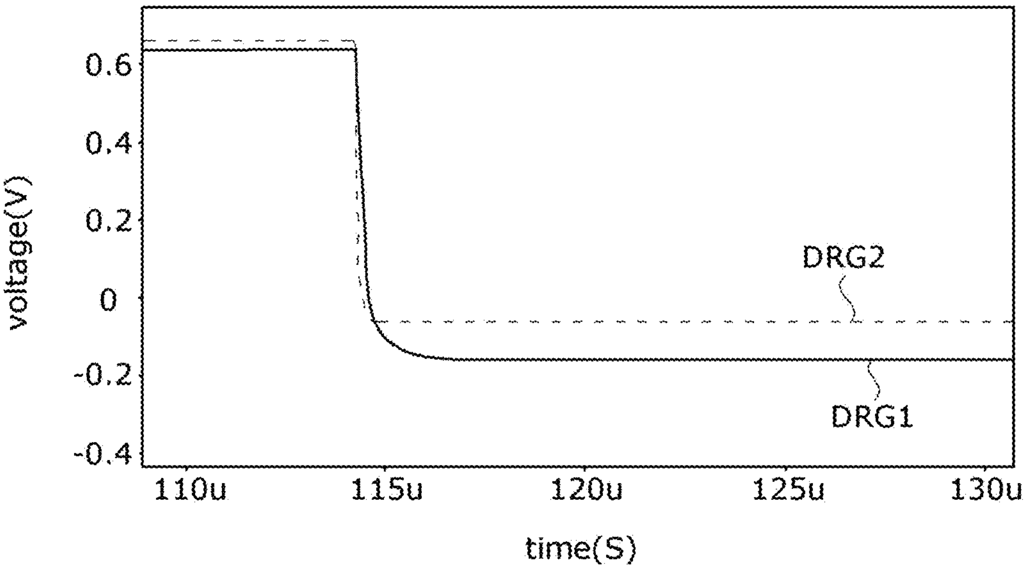
Figure 15:
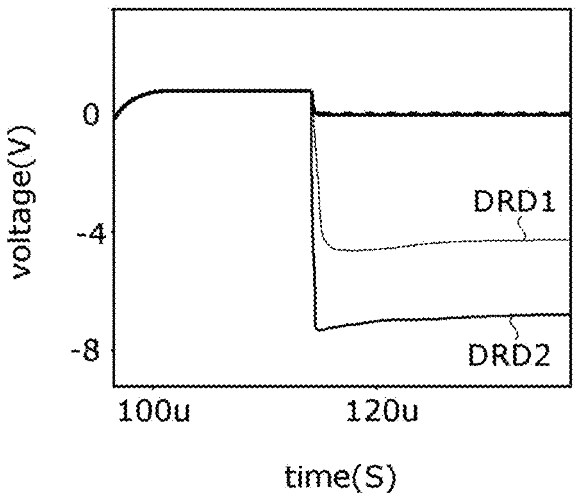
Figure 16:
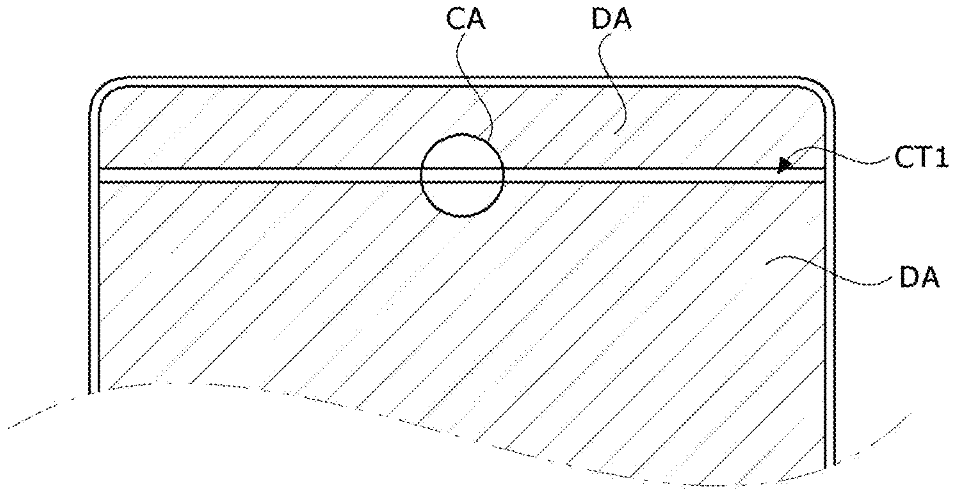
FIG. 16 is a view illustrating a state in which a luminance difference is generated in a partial region of the display device.

As a result, a turn-on time of the first switch element M1 of FIG. 11 is increased, and thus a time for the second node n2 and the third node n3 to be shorted is increased. Accordingly, as shown in FIG. 14, the DRG voltage DRG1 of the pixel connected to the second gate line GL2 becomes lower than the DRG voltage DRG2 of the pixel connected to the first gate line GL1. Additionally, as shown in FIG. 15, the DRD voltage DRD1 of the pixel connected to the second gate line GL2 becomes higher than the DRG voltage DRG2 of the pixel connected to the first gate line GL1. Thus, Vgs becomes larger, and more current flows through the OLED element of the pixel connected to the second gate line GL2. As a result, as shown in FIG. 16, a horizontal line CT1 passing through the second display region CA may appear brighter. This resistance deviation causes uneven luminance.

In order to improve the luminance deviation between the second display region CA and the first display region DA, the resistance deviation of the gate lines needs to be reduced. In particular, there is a problem in that the resistance deviation of the gate signal applied to an oxide transistor is large.

Figure 17:
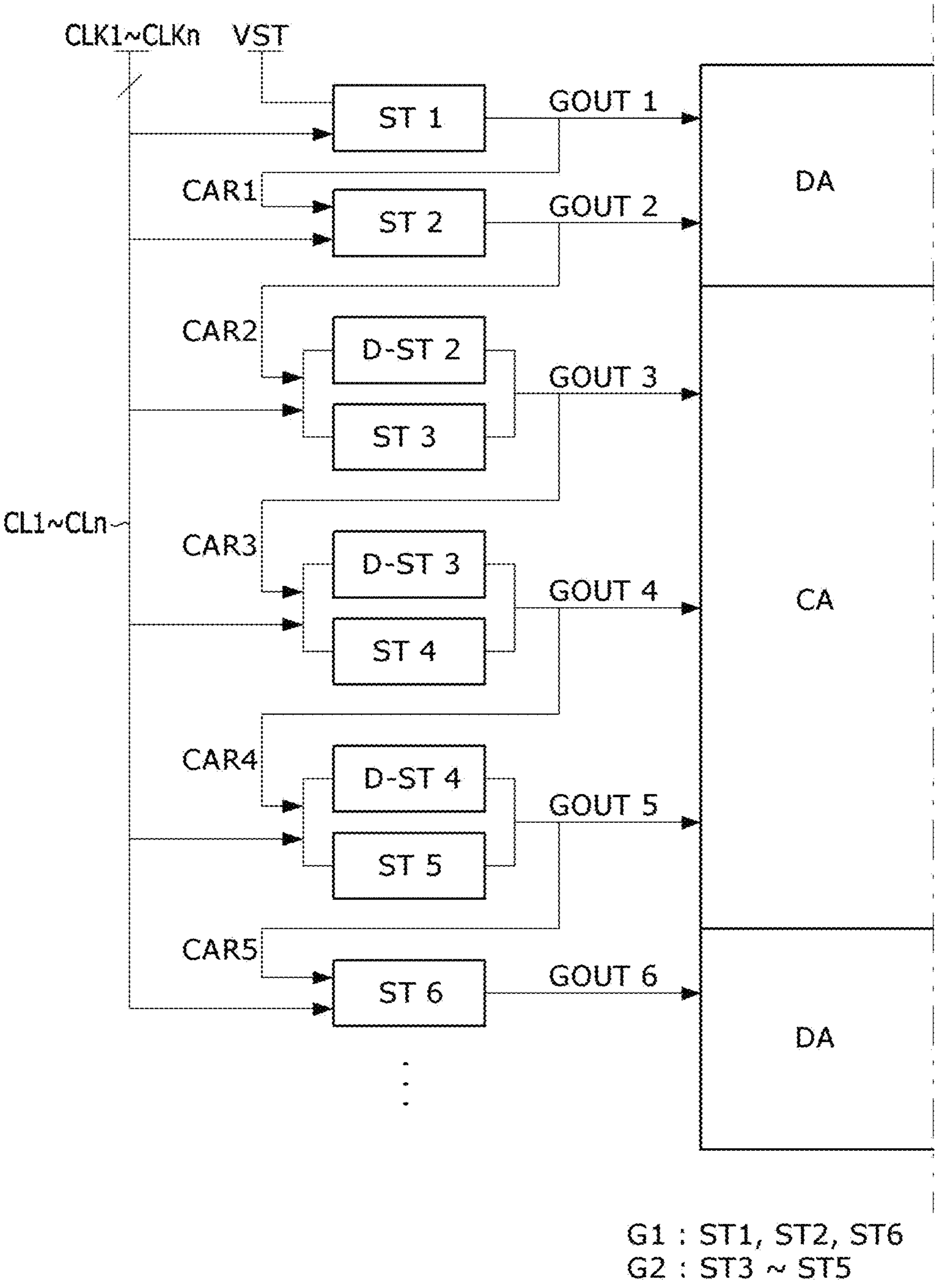
FIG. 17 is a diagram illustrating a gate driving unit according to the embodiment of the present disclosure.
Figure 18:
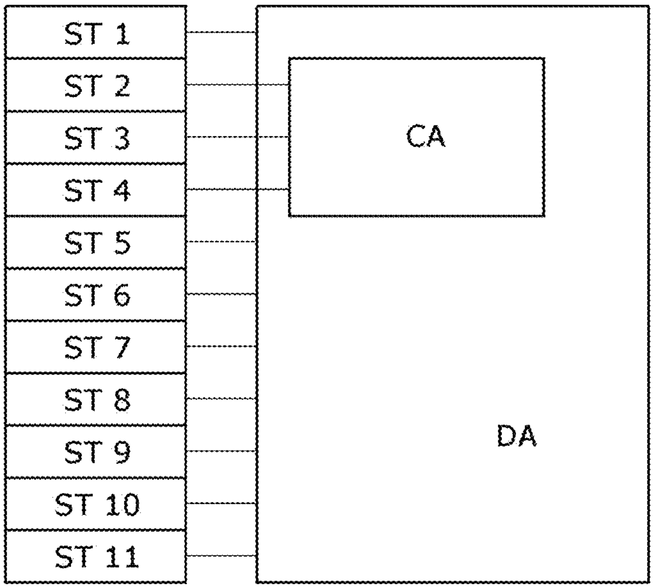
FIG. 18 is a diagram illustrating a plurality of stages configured to output gate signals to the first display region and the second display region.
Figure 19:
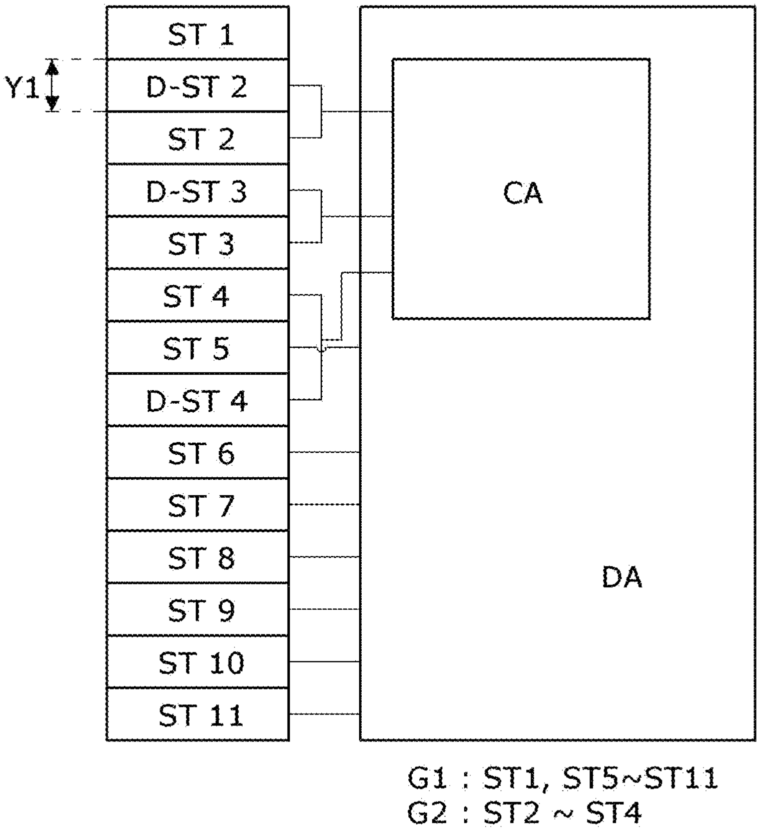
FIG. 19 is a diagram illustrating a state in which a dummy stage is connected to the stage configured to output the gate signal to the second display region, according to the embodiment of the present disclosure.
Figure 20:
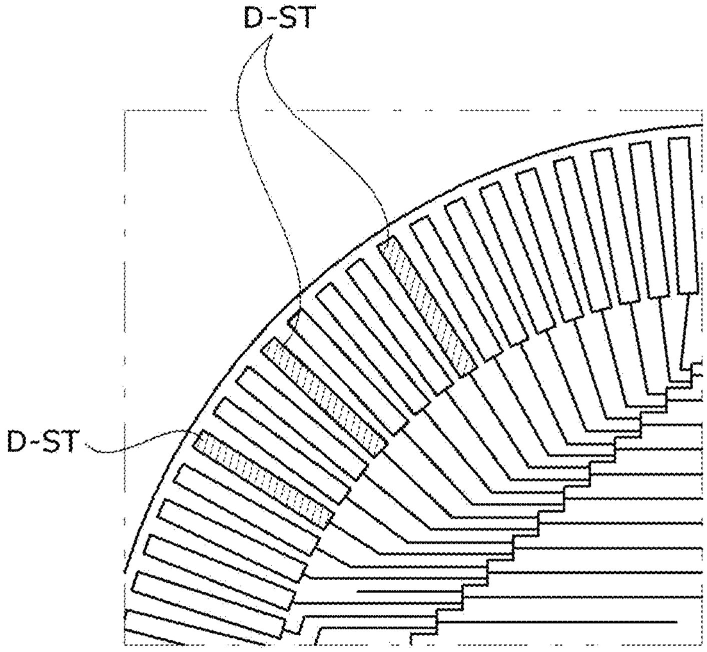
FIG. 20 is a view illustrating the dummy stage disposed at an edge portion of the display device.

FIG. 17 is a diagram illustrating the gate driving unit according to the embodiment. FIG. 18 is a diagram illustrating a state in which a plurality of stages are connected to the display region with the same structure. FIG. 19 is a diagram illustrating a state in which a dummy stage is connected to some stages according to the embodiment. FIG. 20 is a diagram illustrating the dummy stage disposed at an edge portion of the display device.

Referring to FIG. 17, the shift register of the gate driving unit 120 includes stages ST1, ST2, ST3, ST4, ST5, ST6 that are dependently connected. The stages ST1 to ST6 receive a start pulse or carry signals CAR, and receive shift clocks CLK1~CLKn through clock lines CL1 to CLn, respectively. A start pulse VST is a first clock CLK1 input to a first stage ST1. The carry signal CAR may be output from the previous stage and input to a VST node of the next stage.

The stages ST1 to ST6 sequentially output gate signals GOUT1, GOUT2, GOUT3, GOUT4, GOUT5, GOUT6, and at the same time, output carry signals CAR1, CAR2, CAR3, CAR4, CAR5.

A first stage ST1 outputs the carry signal CAR1 through a first output node in response to the start pulse VST and the first shift clock CLK1, and at the same time, outputs the gate signal GOUT1 through a second output node.

A second stage ST2 outputs the carry signal CAR2 through a first output node in response to the carry signal CAR1 output from the first stage ST1 and a second shift clock CLK2, and at the same time, outputs the gate signal GOUT2 through a second output node.

A third stage ST3 outputs the carry signal CAR3 through a first output node in response to the carry signal CAR2 output from the second stage ST2 and a third shift clock CLK3, and at the same time, outputs the gate signal GOUT3 through a second output node.

Here, the carry signal CAR2 output from the second stage ST2 and the third shift clock CLK3 may also be input to a second dummy stage D-ST2 connected in parallel to the third stage ST3. Accordingly, the gate signal GOUT3 may be output through the second output nodes of the third stage ST3 and the second dummy stage D-ST2 connected in parallel.

In the same manner, a fourth stage ST4 and a third dummy stage D-ST3 output the carry signal CAR4 through first output nodes in response to the carry signal CAR3 and a fourth shift clock CLK4, and at the same time, output the gate signal GOUT4 through second output nodes. In addition, a fifth stage ST5 and a fourth dummy stage D-ST4 output the carry signal CAR5 through the first output nodes in response to the carry signal CAR4 and a fifth shift clock CLK5, and at the same time, output the gate signal GOUT5 through second output nodes.

A sixth stage ST6 outputs the gate signal GOUT6 through a second output node in response to the carry signal CAR5 and a sixth shift clock CLK6.

According to the embodiment, it is exemplified that CLK1 to CLK6 are output sequentially, but the present disclosure is not necessarily limited thereto, and the number and order of CLKs may be variously changed according to a phase difference and the number of repetitions.

According to the embodiment, the stages may include a first group G1 for outputting the gate signals to the first display region DA and a second group G2 for outputting the gate signals to the second display region CA. Here, the first stage ST1, the second stage ST2, and the sixth stage ST6 may correspond to the first group G1, and the third to fifth stages ST3 to ST5 may correspond to the second group G2.

The dummy stages are not connected to the stages (a plurality of first stages) of the first group G1, but are connected to the stages (a plurality of second stages) of the second group G2 in parallel. Thus, the stages of the second group G2 may have lower transistor on-resistances compared to the stages of the first group G1, thereby improving output performance. As a result, a luminance difference due to the resistance deviation of the gate lines in the first display region and the second display region may be improved. It should be understood that transistor on-resistances of the stages of the second group G2 being "lower" includes the meaning that, while the transistor on-resistance of the stage itself may not be lowered (e.g., stays the same), connecting the dummy stage thereto effectively lowers transistor on-resistance of the stage from the perspective of the gate line connected thereto.

The dummy stage may be disposed in the display device for various reasons. As an example, the dummy stage may be disposed for voltage coupling of the first stage, for transmitting the carry signal, or for testing. According to the embodiment, the output of the stage may be improved using the dummy stage that can be connected in parallel to the stage. In addition, the dummy stage may be additionally disposed by utilizing an empty space.

Referring to FIG. 18, the stages for outputting the gate signals to the first and second display regions DA and CA may all have the same size. That is, the size of each of the stages disposed in the first display region DA and the size of each of the stages disposed in the second display region CA may all be the same.

However, referring to FIG. 19, the stages of the second group G2 may be relatively smaller in size than the stages of the first group G1 which is beneficial for increasing a space in which the dummy stage may be disposed. As an example, portions for a design margin may be reduced to reduce the size in a first direction Y1. The first direction Y1 may be a direction in which the plurality of stages are disposed.

In addition, another stage may be disposed between the stage and the dummy stage. According to the embodiment, since the dummy stage disposed at a specific position is connected in parallel to the stage, another stage may be disposed between the parallel connected stage and dummy stage.

As an example, the fourth stage ST4 and the fourth dummy stage D-ST4 may be connected in parallel such that outputs thereof are output to the gate lines of the second display region CA, and the fifth stage ST5 disposed between the fourth stage ST4 and the fourth dummy stage D-ST4 may output the gate signal to the first display region DA.

Referring to FIG. 20, the display device according to the embodiment may be utilized in various information technology (IT) devices in addition to a mobile terminal. As an example, IT devices such as laptops, smart watches, and the like have a relatively large area, and have a large amount of utilized space in edge portions, so that sufficient dummy stages D-ST may be secured in the edge portions.

Figure 21:
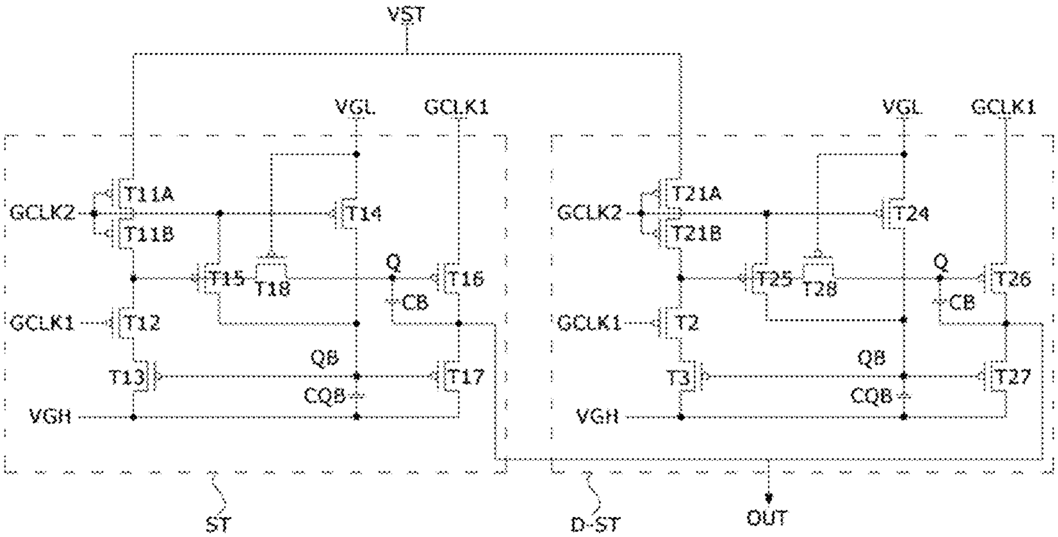
FIG. 21 is a circuit diagram illustrating a state in which the stage and the dummy stage are connected in parallel.

FIG. 21 is a circuit diagram illustrating an example of the stage and the dummy stage.

According to the embodiment, the parallel stages may be configured by connecting the VST nodes of the stage ST and the dummy stage D-ST and connecting the output nodes thereof.

The stage ST and the dummy stage D-ST may be configured as the same circuit. However, circuit structures of the stage and the dummy stage are not particularly limited. The circuit structures of the stage and the dummy stage may be the same or may be different from each other. That is, the number and arrangement of transistors in the stage may be different from the number and arrangement of transistors in the dummy stage. According to the embodiment, any circuit structure may be combined as long as the stage and the dummy stage are connected in parallel to improve an output.

Hereinafter, a case in which the stage includes first, second, third, fourth, fifth, sixth, seventh and eighth transistors T11A, T11B, T12, T13, T14, T15, T16, T17, T18 will be described as an example. The dummy stage includes first, second, third, fourth, fifth, sixth, seventh and eighth transistors T21A, T21B, T22, T23, T24, T25, T26, T27, T28 that are the same as those of the stage. Since operations of the stage and the dummy stage are the same, a description will be based on the stage.

First transistors T11A and T11B are connected between the VST node and a Q node. The first transistors T11A and T11B connect the VST node to the Q node in response to a gate-low voltage VGL of the second clock CLK2. The start pulse VST or a pulse of the carry signal from the previous stage is applied to the VST node. The first transistors T11A and T11B may include two transistors connected in series between the VST node and the Q node to reduce a leakage current. A 1Ath transistor T11A includes a gate electrode connected to a CLK2 node to which the second clock CLK2 is input, a first electrode connected to the VST node, and a second electrode. A 1Bth transistor T11B includes a gate electrode connected to the CLK2 node, a first electrode connected to the second electrode of the 1Ath transistor T11A, and a second electrode connected to the Q node.

A second transistor T12 is connected between the Q node and a third transistor T13. The second transistor T12 is turned on when a voltage of the first clock CLK1 is the gate-low voltage VGL to connect the Q node to a first electrode of the third transistor T13. The second transistor T12 includes a gate electrode connected to a CLK1 node to which the first clock CLK1 is input, a first electrode connected to the Q node, and a second electrode connected to the first electrode of the third transistor T13.

The third transistor T13 is connected between the second transistor T12 and a VGH node. The third transistor T13 is turned on when a voltage of a QB node is the gate-low voltage VGL to connect the second electrode of the second transistor T12 to the VGH node. The third transistor T13 includes a gate electrode connected to the QB node, the first electrode connected to the second electrode of the second transistor T12, and a second electrode connected to the VGH node.

A fourth transistor T14 is coupled between a VGL node and the QB node. The fourth transistor T14 is turned on when a voltage of the CLK2 node is the gate-low voltage VGL to connect the VGL node to the QB node. The fourth transistor T14 includes a gate electrode connected to the CLK2 node, a first electrode connected to the VGL node, and a second electrode connected to the QB node.

A fifth transistor T15 is connected between the CLK2 node and the QB node. The fifth transistor T15 is turned on when a voltage of the Q node is the gate-low voltage VGL to connect the CLK2 node to the QB node. The fifth transistor T15 includes a gate electrode connected to the Q node, a first electrode connected to the CLK2 node, and a second electrode connected to the QB node.

A sixth transistor T16 is turned on when the voltage of the Q node is less than or equal to the gate-low voltage VGL to connect the CLK1 node to the output node. The sixth transistor T16 includes a gate electrode connected to the Q node, a first electrode connected to the CLK1 node, and a second electrode connected to the output node. A capacitor CB is connected between the Q node and the output node.

A seventh transistor T17 is turned on when the voltage of the QB node is the gate-low voltage VGL to connect the VGH node to the output node. The seventh transistor T17 includes a gate electrode connected to the QB node, a first electrode connected to the output node, and a second electrode connected to the VGH node. A capacitor CQB is connected between the QB node and the VGH node.

An eighth transistor T18 includes a gate electrode connected to the VGL node, a first electrode connected to one side of the Q node connected to the first and second transistors T11 and T12, and a second electrode connected to the other side of the Q node connected to the sixth transistor T16.

Figure 22:
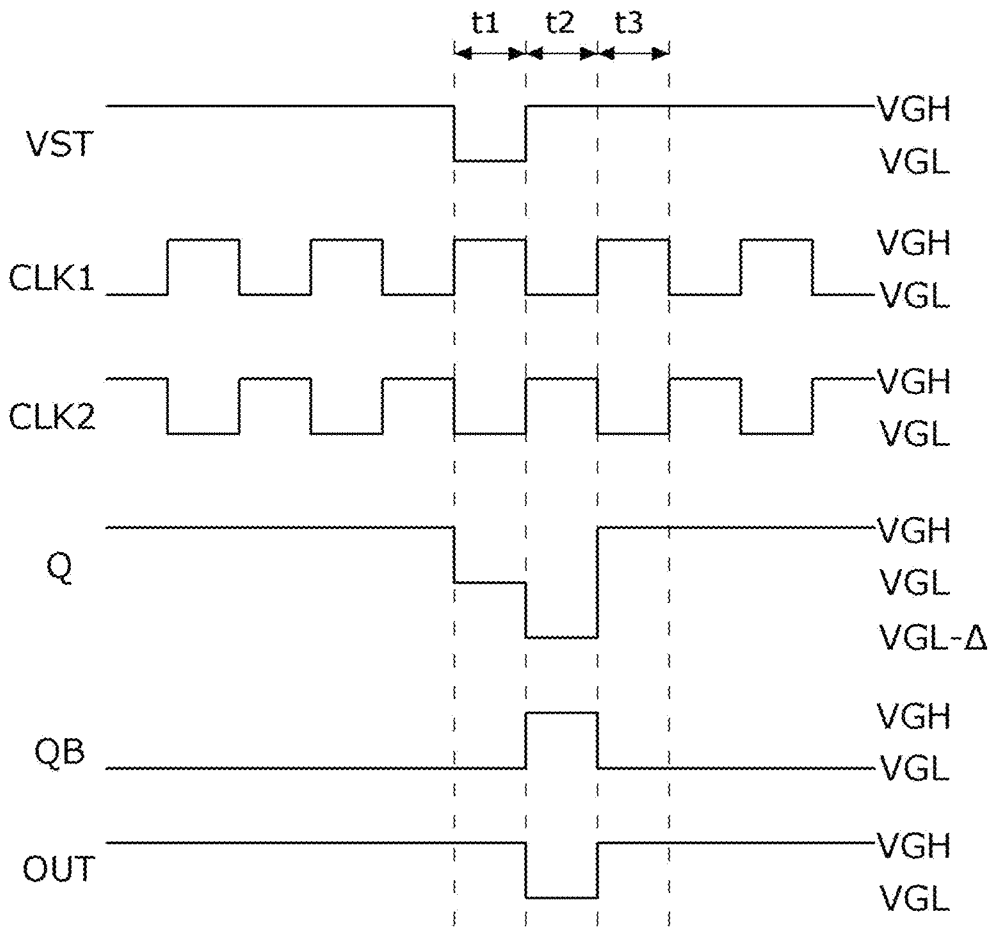
FIG. 22 is a waveform diagram illustrating control node voltages and output signals of the stage shown in FIG. 21.

FIG. 22 is a waveform diagram illustrating control node voltages and output signals of the stage shown in FIG. 21.

Referring to FIG. 22, voltages of the VST node and the CLK2 node are inverted to the gate-low voltage VGL in a period t1 so that the first, fourth, and fifth transistors T11, T14, and T15 are turned on, and voltages of the Q node and the QB node are dropped to the gate-low voltage VGL. Accordingly, the third, sixth, and seventh transistors T13, T16, and T17 are turned on in the period t1, and a voltage of the gate signal OUT is a gate-high voltage VGH. The capacitor CB is charged to the gate-high voltage VGH in the period t1.

The voltage of the CLK2 node is inverted to the gate-high voltage VGH in a period t2, and thus the first and fourth transistors T11 and T14 are turned off, and the Q node is floated, so that the fifth and sixth transistors T15 and T16 remain in an ON state. Since the voltage of the CLK2 node is the gate-high voltage VGH in the period t2 and the fifth transistor T15 is turned on, the voltage of the QB node is increased to the gate-high voltage VGH to turn off the third and seventh transistors T13 and T17. In the period t2, a voltage of the CLK1 node is the gate-low voltage. Thus, the voltage of the gate signal OUT is dropped to the gate-low voltage VGL, and the voltage of the Q node is further dropped to VGL-Δ by bootstrapping through the capacitor CB, thereby turning the eighth transistor T18 on. At this time, the voltage of the Q node at one side above the second transistor T12 is maintained at VGL-Vth, so that a leakage current of the second transistor T12 is reduced. Here, Vth is a threshold voltage of the eighth transistor T18.

The voltage of the CLK2 node is inverted to the gate-low voltage VGL in a period t3 so that the first and fourth transistors T11 and T14 are turned on, and the voltage of the Q node is increased to the gate-high voltage VGH, while the voltage of the QB node is dropped to the gate-low voltage VGL. Accordingly, the third and seventh transistors T13 and T17 are turned on in the period t3 to increase the voltage of the gate signal OUT to the gate-high voltage VGH.

Figure 23:
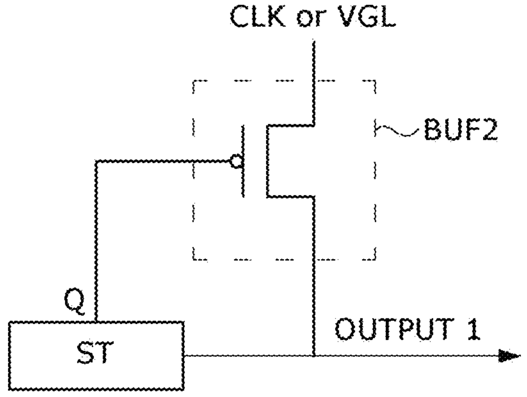
FIG. 23 is a diagram illustrating a state in which a sub-output buffer is connected in parallel to the stage.
Figure 24:
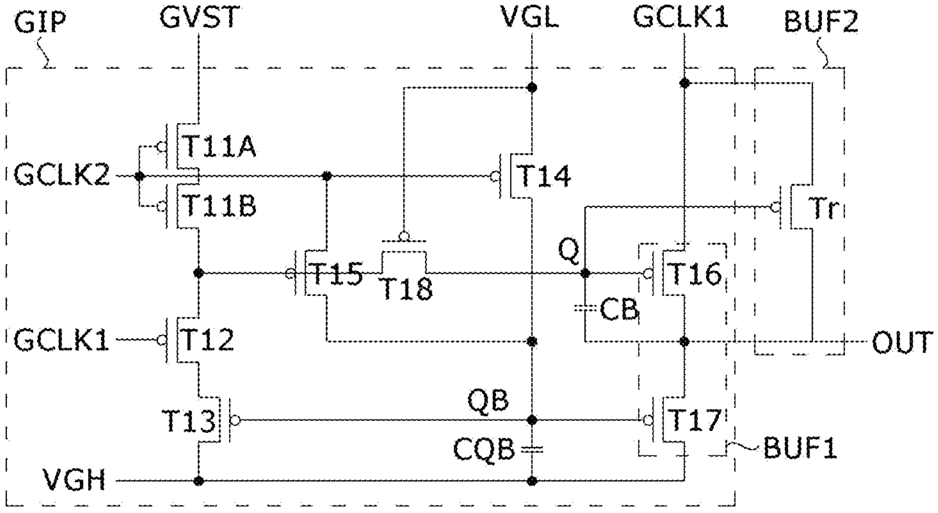
FIG. 24 is a circuit diagram illustrating an example in which the sub-output buffer is connected in parallel to the stage.

FIG. 23 is a diagram illustrating a state in which a sub-output buffer is connected to the stage in parallel. FIG. 24 is a circuit diagram illustrating an example in which the sub-output buffer is connected in parallel to the stage.

Referring to FIG. 23, one feature of the present disclosure is to adjust the output resistance by connecting the dummy stage D-ST to the stage ST in parallel, but when there is no spatial margin in which the dummy stage D-ST is disposed at a corresponding point or for other beneficial reasons, output characteristics of the stage ST may be improved through the design of adding only a sub-output buffer BUF2 to the stage ST. Since the output of the stage ST is affected by the size of the transistor, the output characteristics of the stage ST may be improved through the design of adding the sub-output buffer BUF2 to the stage ST connected to the second display region CA. The size of the transistor may be a channel ratio (W/L) of the transistor. As the channel ratio increases, a current flowing through the channel increases and an on-resistance may be lowered.

Referring to FIG. 24, a gate of an output transistor Tr of the sub-output buffer BUF2 is connected to the Q node of the stage ST, and one end of the output transistor Tr is connected to GCLK1 or VGL, and the other end of the output transistor Tr is connected to the output node of the stage ST. Since the output transistor Tr of the sub-output buffer BUF2 is connected in parallel to the sixth transistor T16, on-resistance characteristics may be improved. That is, the sub-output buffer may be connected to a main buffer BUF1 of the stage ST in parallel. Thus, the output characteristics of the stage ST may be improved. It should be understood that on-resistances of the stages being "improved" includes the meaning that, while the on-resistance inside of the stage itself may not be improved (e.g., stays the same), connecting the sub-output buffer BUF2 thereto effectively lowers on-resistance of the stage from the perspective of the gate line connected thereto.

In the embodiment, the sub-output buffer is connected to the sixth transistor T16 constituting the main buffer BUF1, but the present disclosure is not necessarily limited thereto. As an example, the sub-output buffer may be connected to the seventh transistor T17 in parallel. When the sub-output buffer BUF2 is connected in parallel to a pull-up transistor and/or a pull-down transistor of the main buffer BUF1, both the output voltages of VGH and VGL may be improved.

Figure 25:
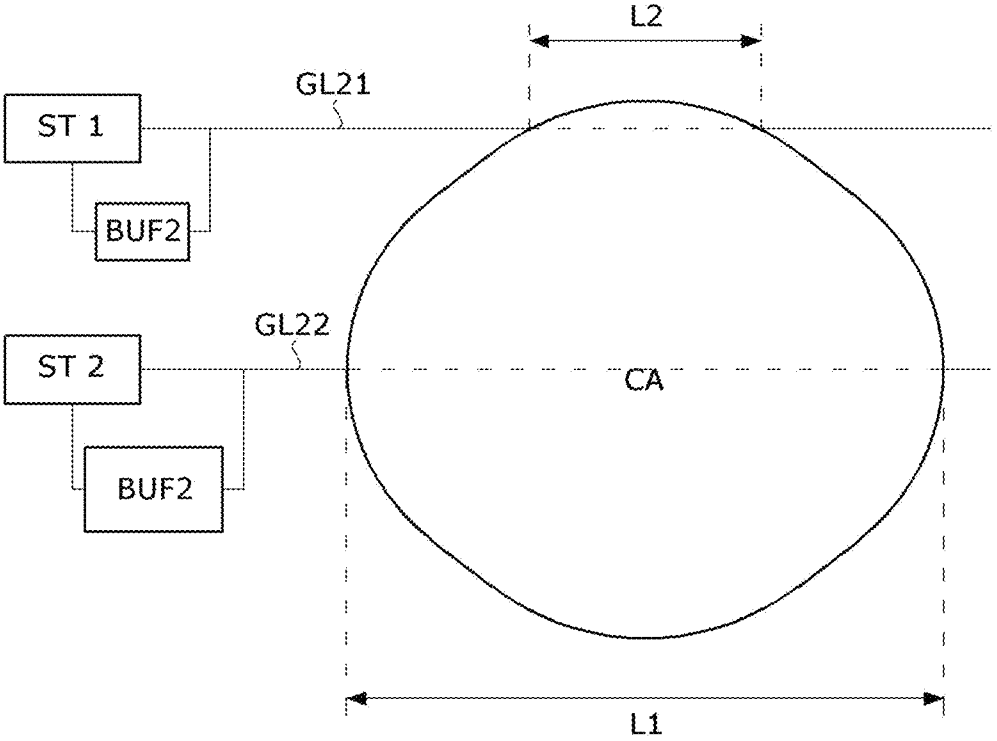
FIG. 25 is a diagram illustrating a state in which a size of the sub-output buffer is adjusted according to a position of the second display region.

FIG. 25 is a diagram illustrating a state in which the size of the sub-output buffer is adjusted.

According to the embodiment, lengths of the gate lines passing through the second display region CA may be different from each other. Accordingly, since the resistance deviation occurs according to the length of each gate line passing through the second display region CA, the resistance deviation may be minimized or reduced by adjusting the size of the sub-output buffer BUF2. When the size of the sub-output buffer BUF2 increases, the on-resistance of the transistor is lowered, thereby improving the output characteristics.

According to the embodiment, a size of the sub-output buffer BUF2 connected to each stage may be proportional to a length with which the gate line connected to the corresponding stage passes through the second display region CA.

As an example, a 2-2 gate line GL22 passing through the center of the second display region CA may have a relatively high resistance because a length L1 with which the 2-2 gate line GL22 pass through the second display region CA is greater than a length L2 with which a 2-1 gate line GL21 passes through the second display region CA. Thus, the resistance deviation may be reduced by further increasing the size of the sub-output buffer BUF2 of the stage connected to the 2-2 gate line GL22.

In addition, the sub-output buffer BUF2 may be connected to some stages ST, and the dummy stage may be connected in parallel to some other stages ST. When there is an available dummy stage, the available dummy stage may be connected in parallel to a stage (a 2-1 stage), and the sub-output buffer may be connected in parallel to a stage (a 2-2 stage) when there is no space or it is difficult to connect the dummy stage thereto. As described above, the dummy stage and the sub-output buffer are selectively connected to the stage according to the surrounding space margin, thereby resolving the resistance deviation.

Figure 26:
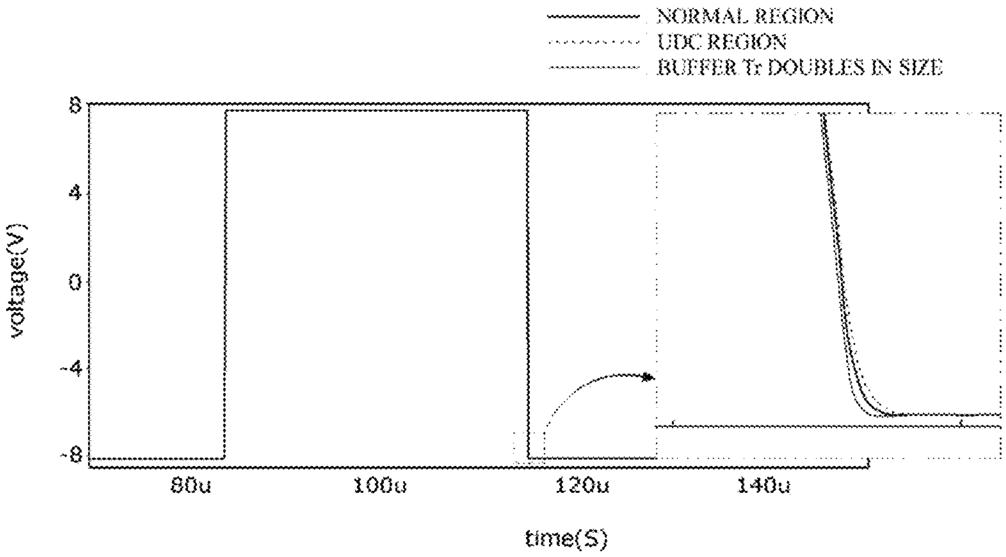
FIG. 26 is a diagram illustrating a state in which a voltage charging speed is improved by the output buffer.

FIG. 26 is a diagram illustrating a state in which a voltage charging speed is improved by the output buffer.

Referring to FIG. 26, it can be seen that the voltage charging speed is increased when the size of the sub-output buffer is increased by twice. Accordingly, it can be confirmed that the resistance deviation caused by the gate electrode of the second display region may be reduced.

Since the content of the present disclosure described in the problems to be solved, the problem-solving means, and effects does not specify essential features of the claims, the scope of the claims is not limited to matters described in the content of the disclosure.

According to an embodiment, a resistance deviation of gate lines connected to an imaging region and a display region can be improved. Accordingly, luminance uniformity between the display region and the imaging region can be improved.

Effects of the present disclosure will not be limited to the above-mentioned effects and other unmentioned effects will be clearly understood by those skilled in the art from the following claims.

While the embodiments of the present disclosure have been described in detail above with reference to the accompanying drawings, the present disclosure is not necessarily limited to these embodiments, and various changes and modifications may be made without departing from the technical spirit of the present disclosure. Accordingly, the embodiments disclosed herein are to be considered descriptive and not restrictive of the technical spirit of the present disclosure, and the scope of the technical spirit of the present disclosure is not limited by these embodiments. Accordingly, the above-described embodiments should be understood to be exemplary and not limiting in any aspect. The scope of the present disclosure should be construed by the appended claims, and all technical spirits within the scopes of their equivalents should be construed as being included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device, comprising:

a display panel including:

a first display region having a plurality of first pixels; and a second display region having a plurality of second pixels and a plurality of light-transmitting regions;

a plurality of data lines through which data signals of the plurality of first pixels and the plurality of second pixels are output;

a plurality of gate lines through which gate signals of the plurality of first pixels and the plurality of second pixels are output; and a gate driving unit including:

a plurality of stages configured to output the gate signals to the plurality of gate lines; and a dummy stage connected in parallel to at least one stage of the plurality of stages.

2. The display device of claim 1, wherein the plurality of gate lines includes:

a plurality of first gate lines configured to supply the gate signals to the first display region; and a plurality of second gate lines configured to supply the gate signals to the first display region and the second display region.

3. The display device of claim 2, wherein the plurality of stages includes:

a plurality of first stages configured to supply the gate signals to the plurality of first gate lines; and a plurality of second stages configured to supply the gate signals to the plurality of second gate lines, wherein at least one of the plurality of second stages is connected in parallel to the dummy stage.

4. The display shifter of claim 3, wherein a size of each of the plurality of second stages is less than a size of each of the plurality of first stages.

5. The display device of claim 3, wherein at least one first stage is disposed between the at least one second stage and the dummy stage that are connected in parallel.

6. The display device of claim 3, wherein a circuit structure of the second stage is the same as a circuit structure of the dummy stage.

7. The display device of claim 2, wherein the plurality of first gate lines do not overlap the second display region.

8. The display device of claim 3, wherein the plurality of second stages includes:

a 2-1 stage to which the dummy stage is connected in parallel; and a 2-2 stage to which a sub-output buffer is connected in parallel.

9. The display device of claim 8, wherein each of the plurality of second gate lines includes:

a first signal line disposed in the first display region;

a second signal line disposed in the second display region; and a through electrode configured to connect the first signal line and the second signal line, wherein the first signal line and the second signal line are disposed on different layers from each other.

10. The display device of claim 9, wherein the second signal line has a higher resistance than the first signal line.

11. The display device of claim 9, wherein the plurality of second gate lines includes a 2-1 gate line and a 2-2 gate line;

a length of the second signal line of the 2-2 gate line is greater than a length of the second signal line of the 2-1 gate line; and a size of the sub-output buffer that is connected in parallel to the 2-2 stage connected to the 2-2 gate line is greater than a size of a sub-output buffer that is connected in parallel to a second stage of the plurality of second stages that is connected to the 2-1 gate line.

12. A display device, comprising:

a display panel including:

a first display region having a plurality of first pixels; and a second display region having a plurality of second pixels and a plurality of light-transmitting regions;

a plurality of data lines through which data signals of the plurality of first pixels and the plurality of second pixels are output;

a plurality of gate lines through which gate signals of the plurality of first pixels and the plurality of second pixels are output; and a gate driving unit including:

a plurality of stages configured to output the gate signals to the plurality of gate lines; and a sub-output buffer connected in parallel to at least one stage of the plurality of stages.

13. The display device of claim 12, wherein the sub-output buffer includes an output transistor connected in parallel to at least one of a pull-up transistor and a pull-down transistor of the at least one stage.

14. The display device of claim 12, wherein the plurality of gate lines includes:

a plurality of first gate lines configured to supply the gate signals to the first display region; and a plurality of second gate lines configured to supply the gate signals to the first display region and the second display region.

15. The display device of claim 14, wherein the plurality of stages includes:

a plurality of first stages configured to supply the gate signals to the plurality of first gate lines; and a plurality of second stages configured to supply the gate signals to the plurality of second gate lines, wherein at least one second stage of the plurality of second stages is connected in parallel to the sub-output buffer.

16. The display device of claim 14, wherein each of the plurality of second gate lines includes:

a first signal line disposed in the first display region;

a second signal line disposed in the second display region; and a through electrode configured to connect the first signal line and the second signal line, wherein the first signal line and the second signal line are disposed on different layers from each other.

17. The display device of claim 16, wherein the second signal line has a higher resistance than the first signal line.

18. A device, comprising:

a sensor;

a display panel including:

a first display region; and a second display region that has higher transparency than the first display region and overlaps the sensor;

a plurality of data lines that, in operation, output data signals to a first pixel of the first display region and a second pixel of the second display region;

a first gate line that extends across the entire display panel and, in operation, outputs a first gate signal to the first pixel, the entire first gate line being outside the second display region;

a second gate line that extends through the second display region and, in operation, outputs a second gate signal to the second pixel and a third pixel that is in the first display region; and a gate driver including:

a first stage that, in operation, outputs the first gate signal; and a second stage that, in operation, outputs the second gate signal, the second stage having lower transistor on-resistance than that of the first stage.

19. The device of claim 18, further comprising:

a third gate line that extends through the second display region, the third gate line extending through a length of the second display region that exceeds a length of the second display region that the second gate line extends through;

a first sub-output buffer connected to the second gate line; and a second sub-output buffer connected to the third gate line, size of the second sub-output buffer exceeding that of the first sub-output buffer.

20. The device of claim 18, wherein the gate driver includes a dummy stage connected in parallel with the second stage, and the second gate signal is outputted by the second stage and the dummy stage.

* * * * *